United States Patent
Gray et al.

(10) Patent No.: US 11,373,140 B2
(45) Date of Patent: *Jun. 28, 2022

(54) DISPENSER AND ASSOCIATED TRACKING APPLICATION

(71) Applicant: Kohl's, Inc., Menomonee Falls, WI (US)

(72) Inventors: Beau Gray, Menomonee Falls, WI (US); Stephanie Sansoucie, Loves Park, IL (US)

(73) Assignee: Kohl's, Inc., Menomonee Falls, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/006,720

(22) Filed: Aug. 28, 2020

(65) Prior Publication Data

US 2020/0394601 A1 Dec. 17, 2020

Related U.S. Application Data

(63) Continuation of application No. 15/445,078, filed on Feb. 28, 2017, now Pat. No. 10,762,469, which is a
(Continued)

(51) Int. Cl.
*G06Q 10/08* (2012.01)
*G06Q 20/18* (2012.01)
(Continued)

(52) U.S. Cl.
CPC .......... *G06Q 10/087* (2013.01); *G06Q 20/18* (2013.01); *G07F 9/026* (2013.01); *G07F 11/36* (2013.01)

(58) Field of Classification Search
CPC ...... G06Q 10/087; G06Q 20/18; G07F 9/026; G07F 11/36; G07F 9/001
(Continued)

(56) References Cited

U.S. PATENT DOCUMENTS 6,204,763 B1 * 3/2001 Sone .................... G06Q 10/087
340/5.1
6,529,692 B1 3/2003 Haines et al.
(Continued)

OTHER PUBLICATIONS

USPTO Notice of Allowance dated Oct. 31, 2019 for U.S. Appl. No. 14/085,635, filed Nov. 20, 2013, 10 pages.
(Continued)

*Primary Examiner* — Garcia Ade
(74) *Attorney, Agent, or Firm* — Perkins Coie LLP

(57) ABSTRACT

Systems, methods, and apparatuses are provided for storing, dispensing, and facilitating replenishment of a dispenser. The dispenser may store and dispense one or more types of consumable items. Additionally, the dispenser may include one or more sensors for sensing a storage status of the dispenser (e.g., the quantity consumable items remaining in the dispenser). Further still, the dispenser may communicate storage status updates to a remote device on which a related application can be executed, for updating a current storage status, and presenting a notification to a user of the remote device, suggesting the purchase of additional consumable items to replenish the dispenser. The related application may further present the user with other types of purchasing-related information, such as cross merchandise opportunities, a retailer located nearest to the user/mobile device where the additional consumable items can be purchased from, as well as other shopping-related features and/or functionalities.

15 Claims, 14 Drawing Sheets

Related U.S. Application Data continuation of application No. 14/085,635, filed on Nov. 20, 2013, now Pat. No. 10,579,958.

(51) Int. Cl.
  *G07F 9/02* (2006.01)
  *G07F 11/36* (2006.01)
  *G06Q 20/32* (2012.01)

(58) Field of Classification Search
  USPC .......................................................... 705/28
  See application file for complete search history.

(56) References Cited

U.S. PATENT DOCUMENTS

| | | | |
|---|---|---|---|
| 7,020,680 B2 * | 3/2006 | Defosse | G06Q 20/32 |
| | | | 705/28 |
| 7,084,769 B2 | 8/2006 | Bauer et al. | |
| 7,130,820 B2 | 10/2006 | Song | |
| 7,203,572 B2 | 4/2007 | Crisp, III | |
| 7,386,477 B2 | 6/2008 | Fano | |
| 7,577,577 B2 | 8/2009 | Lyon et al. | |
| 7,591,417 B1 | 9/2009 | Mathias, Jr. et al. | |
| 7,657,463 B1 * | 2/2010 | Shaw | G06Q 30/0283 |
| | | | 705/26.1 |
| 7,769,601 B1 | 8/2010 | Bleser et al. | |
| 7,783,508 B2 | 8/2010 | Murray et al. | |
| 7,797,327 B2 | 9/2010 | Kataria et al. | |
| 7,801,774 B2 | 9/2010 | Kamalkar et al. | |
| 7,864,045 B2 | 1/2011 | Karr | |
| 7,954,711 B2 | 6/2011 | Adstedt et al. | |
| 8,050,984 B2 | 11/2011 | Bonner et al. | |
| 8,054,180 B1 | 11/2011 | Scofield et al. | |
| 8,103,378 B2 * | 1/2012 | Crisp, III | B67D 7/346 |
| | | | 700/239 |
| 8,130,102 B1 | 3/2012 | Nguyen | |
| 8,190,290 B2 | 5/2012 | Crisp, III | |
| 8,200,535 B1 | 6/2012 | Reddin et al. | |
| 8,224,718 B1 | 7/2012 | Sholtis et al. | |
| 8,254,961 B2 | 8/2012 | Moon et al. | |
| 8,266,017 B1 | 9/2012 | Dearlove et al. | |
| 8,285,604 B1 | 10/2012 | Trandal et al. | |
| 8,319,607 B2 | 11/2012 | Grimlund et al. | |
| 8,325,036 B1 | 12/2012 | Fuhr et al. | |
| 8,341,041 B2 | 12/2012 | Hull | |
| 8,370,271 B1 | 2/2013 | Robinson et al. | |
| 8,416,073 B1 | 4/2013 | Scofield et al. | |
| 10,579,958 B2 | 3/2020 | Gray et al. | |
| 10,762,469 B2 | 9/2020 | Gray et al. | |
| 2009/0192924 A1 | 7/2009 | Ku | |
| 2009/0198510 A1 | 8/2009 | Ditto | |
| 2011/0094391 A1 | 4/2011 | Erba et al. | |
| 2011/0173028 A1 | 7/2011 | Bond | |
| 2011/0246300 A1 | 10/2011 | Yarvis et al. | |
| 2011/0320318 A1 | 12/2011 | Patel et al. | |
| 2012/0123673 A1 | 5/2012 | Perks et al. | |
| 2012/0143720 A1 | 6/2012 | Moser | |
| 2012/0150620 A1 | 6/2012 | Mandyam et al. | |
| 2012/0182825 A1 | 7/2012 | Rime | |
| 2012/0259655 A1 | 10/2012 | Madreperla | |
| 2012/0265364 A1 | 10/2012 | Zambrano | |
| 2012/0303480 A1 | 11/2012 | Stone | |
| 2013/0060627 A1 | 3/2013 | Harrison | |
| 2013/0073473 A1 | 3/2013 | Heath | |
| 2013/0080183 A1 | 3/2013 | Bond | |
| 2013/0097032 A1 | 4/2013 | Fisher | |

OTHER PUBLICATIONS

Egg Minder, https://www.quirky.com/shop/619-Egg-Minder-Smart-Egg-Tray?gclid=CPe5y6-mqbsCFfBDMgodO9kAma, Mar. 20, 2014 (date printed).

USPTO Non-Final Office Action dated Apr. 17, 2019 for U.S. Appl. No. 14/085,635, filed Nov. 20, 2013, 13 pages.

USPTO Restriction Requirement dated Oct. 3, 2017 for U.S. Appl. No. 14/085,635, filed Nov. 20, 2013, 8 pages.

USPTO Non-Final Office Action dated Apr. 14, 2016 for U.S. Appl. No. 14/085,635, filed Nov. 20, 2013, 9 pages.

USPTO Final Office Action dated Jun. 25, 2015 for U.S. Appl. No. 14/085,635, filed Nov. 20, 2013, 15 pages.

USPTO Non-Final Office Action dated Dec. 16, 2014 for U.S. Appl. No. 14/085,635, filed Nov. 20, 2013, 18 pages.

USPTO Notice of Allowance dated May 1, 2020 for U.S. Appl. No. 15/445,078, filed Feb. 28, 2017, 13 pages.

USPTO Non-Final Office Action dated Jan. 9, 2020 for U.S. Appl. No. 15/445,078, filed Feb. 28, 2017, 16 pages.

USPTO Restriction Requirement dated Mar. 27, 2019 for U.S. Appl. No. 15/445,078, filed Feb. 28, 2017, 7 pages.

USPTO Restriction Requirement dated Oct. 9, 2018 for U.S. Appl. No. 15/445,078, filed Feb. 28, 2017, 8 pages.

USPTO Non-Final Office Action dated Jul. 27, 2018 for U.S. Appl. No. 14/085,635, filed Nov. 20, 2013, 8 pages.

* cited by examiner

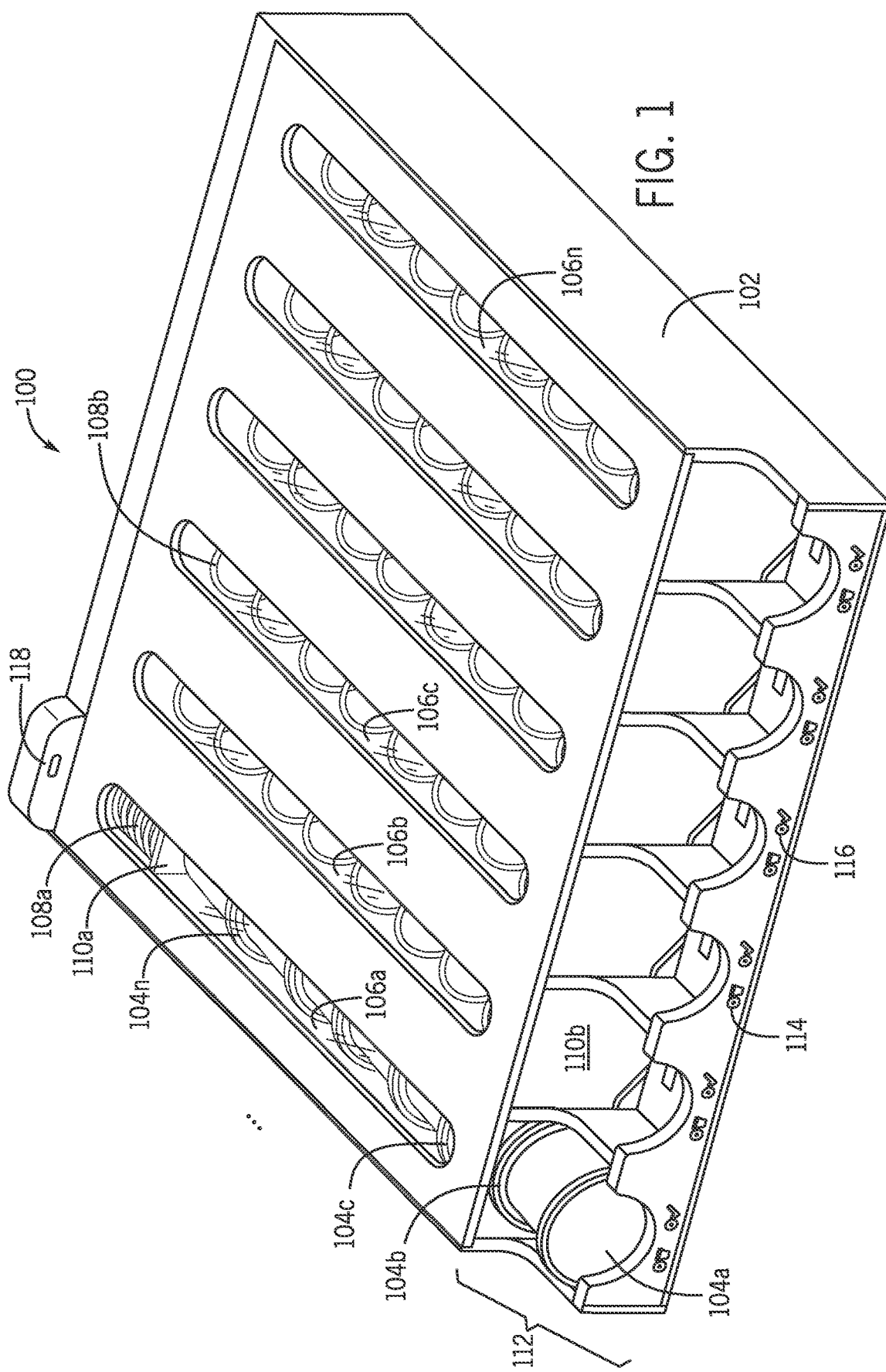

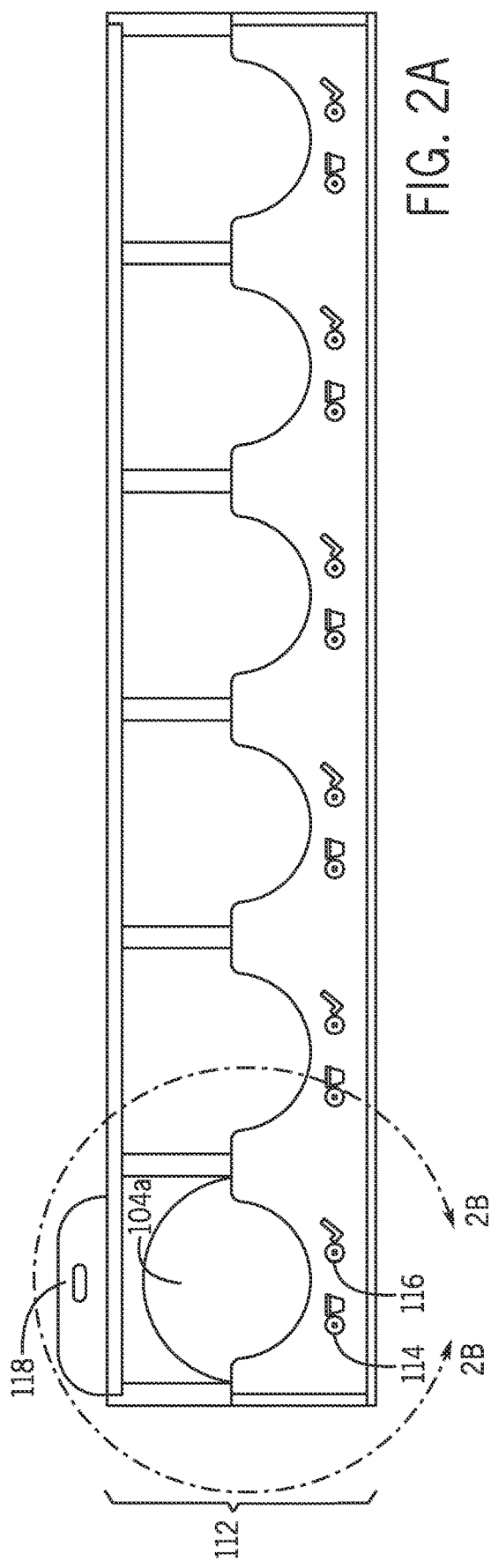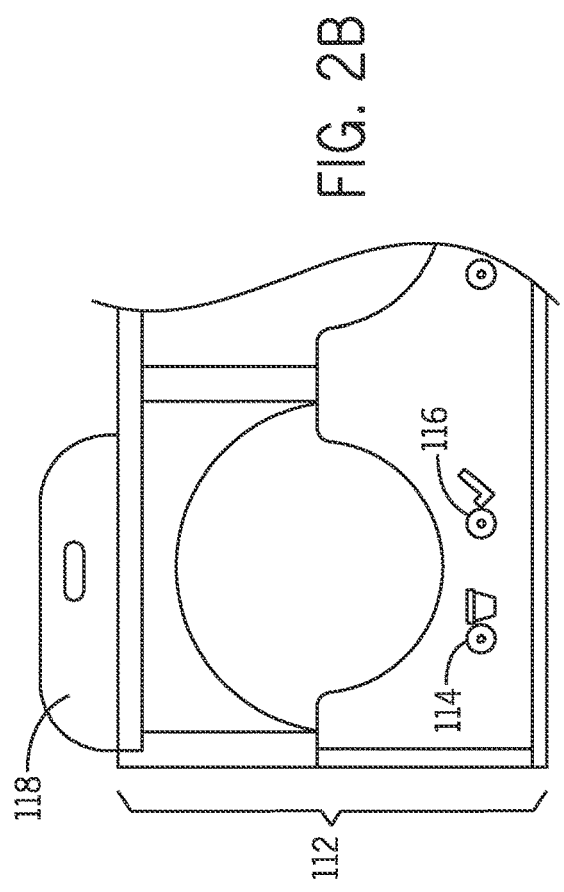

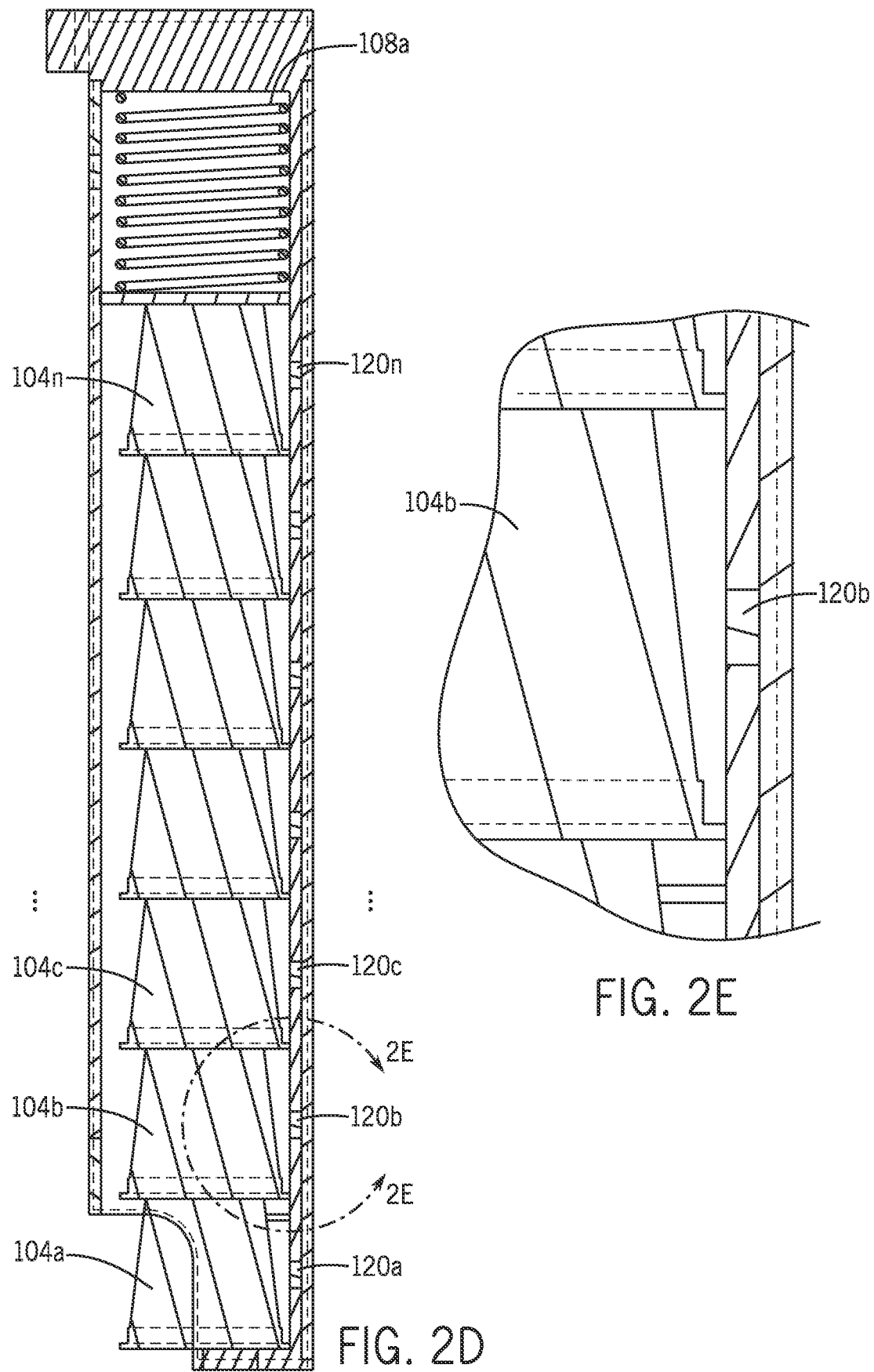

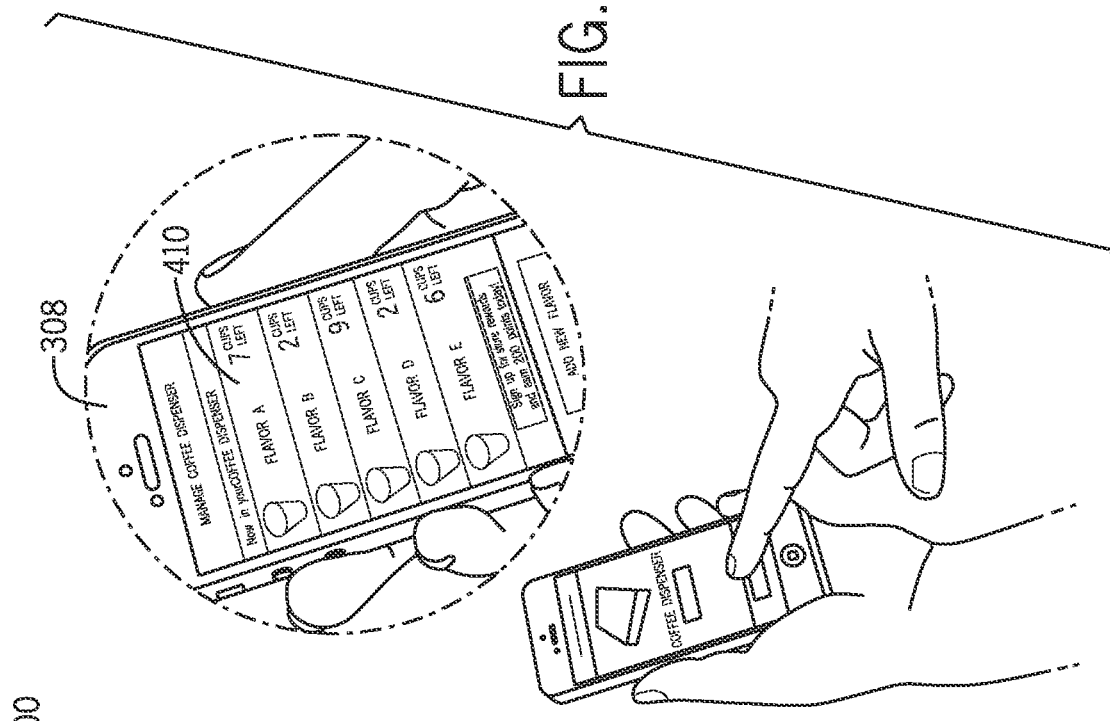
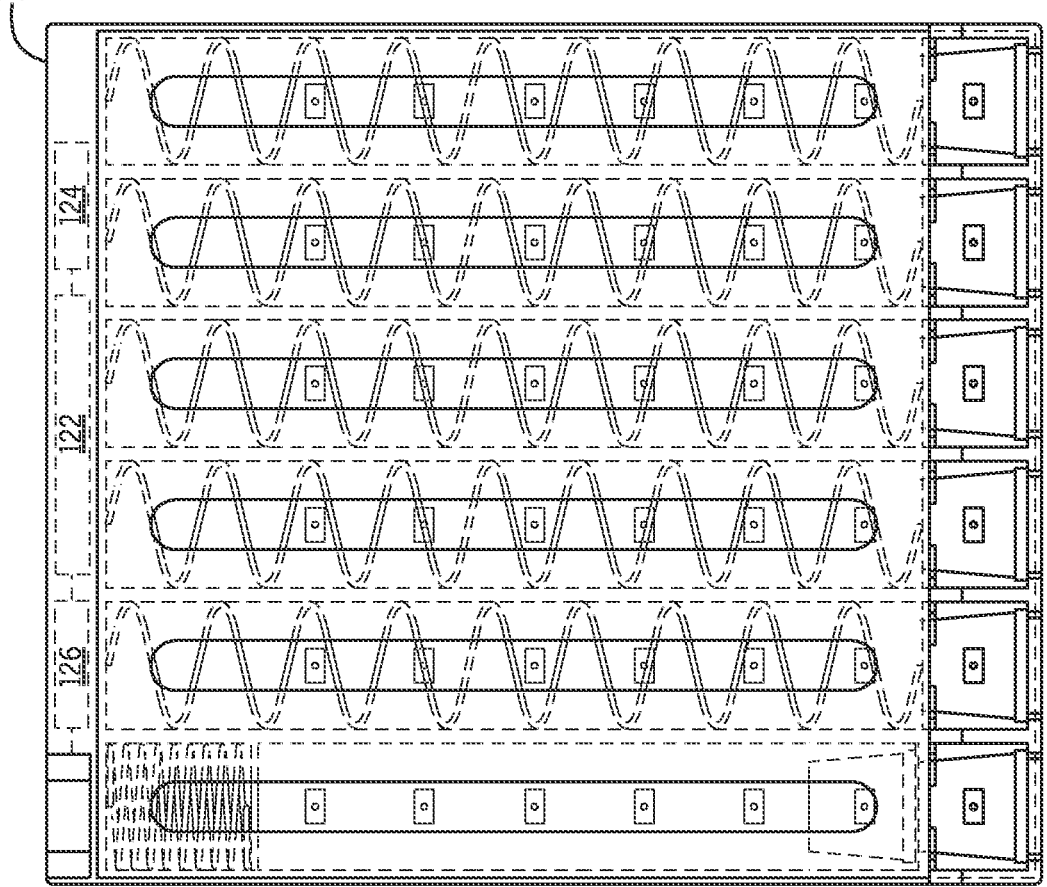
FIG. 4A

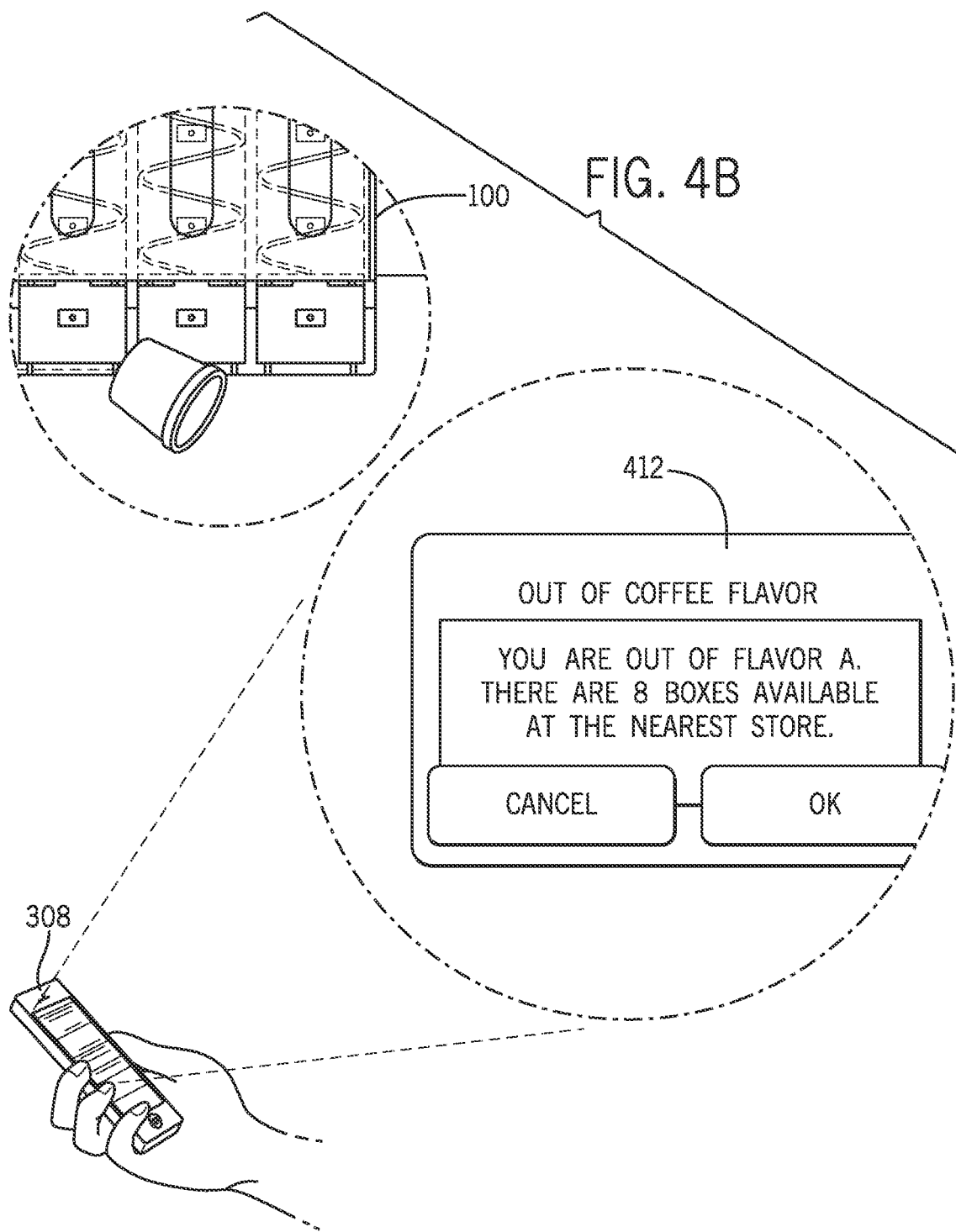

DISPENSER AND ASSOCIATED TRACKING APPLICATION

CROSS-REFERENCE TO RELATED APPLICATION(S)

The present application is a continuation of U.S. patent application Ser. No. 15/445,078, filed Feb. 28, 2017, issuing as U.S. Pat. No. 10,762,469 on Sep. 1, 2020, which is a continuation of U.S. patent application Ser. No. 14/085,635, filed Nov. 20, 2013, now issued as U.S. Pat. No. 10,579,958 on Mar. 3, 2020, all of which are hereby incorporated herein by reference in their entireties.

TECHNICAL FIELD

The present application relates generally to eco-system enabled devices, services and applications, such as for example, dispensers, such as for single serve coffee packs, and related applications for facilitating replenishment of such dispensers.

BACKGROUND

Computing has evolved from utilizing large stand-alone computers to perform tasks, such as calculating mathematical problems, to utilizing downsized processors/microprocessors (that can be included in small, personal mobile devices, such as smart phones and other consumer devices) to perform more advanced tasks, such as presenting multimedia content. Connectivity to data networks, such as the Internet, has also evolved, from users being limited to wired connections to users being able to access the Internet wirelessly through a variety of wireless networks, such as Wi-Fi networks, cellular provider networks, and the like, thereby effectuating different types of communications, and mobile access to information.

As a result of the aforementioned evolution of computing and data connectivity, in addition to the reduction in costs of implementing and utilizing such technologies, consumers are demanding more and better integration of mobile and/or digitally/microprocessor-controlled devices with daily activities. Additionally, consumers are discovering the power of having access to greater and more varied stores of data or information that can assist in making the functionality of the above-noted devices even more useful and efficient in their lives and as well as in interactions with businesses and between each other.

Further still, machine-to-machine (M2M) technologies, such as radio frequency identification (RFID) tags, global positioning systems (GPS), and advances in sensor technologies, such as Zigbee sensors, allow for better, more efficient, and more accessible monitoring and/or tracking of entities, such as physical assets, environmental conditions, etc. For example, vehicle fleet management systems can rely on such technologies to track fuel usage, status, and speed of vehicles to provide better responses to fuel consumption or traffic navigation needs, as well as provide telematic features, such as live operator functionality to vehicle drivers. Another example is in the field of asset management, where, e.g., manufacturers, can better track the location and use of physical equipment, and improve their manufacturing processes as a result. Still other examples include the use of retail store kiosks that allow consumers to check the pricing of an item, remotely monitoring a patient's medical condition, and improving energy consumption by real-time monitoring of electricity usage through the use of smart meters.

Eco-system enabled devices and applications can be developed to take advantage of these advances in technology. These eco-system enabled devices and applications can be used by sellers to create "connected" products that can be offered to customers at the moment of need. New interactions with customers can be created that are contextual to a moment of need, away from a store and website, and/or based on the geographic location of the customer. These eco-system enabled products can be used to save the customer time and effort by establishing these contextual interactions while, at the same time, reinforcing the connection and relationship with the seller. This strengthened relationship can lead to new opportunities for the seller to offer products and/or services to the customer at specific times and in specific locations in which the customer is in need of the product or service.

SUMMARY

Various aspects of examples of the invention are set out in the claims.

According to a first aspect, an apparatus may comprise a dispenser for storing and dispensing items. The apparatus may further comprise at least one sensor for detecting a storage status associated with the storing and the dispensing of the items. Further still, the apparatus may comprise a communications device for transmitting storage status updates regarding the detected storage status to a remote device adapted to, based on the storage status updates, display a notification suggesting replenishment of the apparatus with additional items, and indicating a retailer located proximate to the remote device where the additional items are in stock and purchasable to replenish the dispenser. Alternatively, instead of the notification indicating the retailers located proximate to the communication device, the user interface could be adapted to allow online purchasing of the additional items via the communication device. In another alternative, the online purchasing option could be added as an additional option to displaying a retailer located proximate the communication device.

According to a second aspect, an apparatus, such as a Smartphone, may comprise at least one processor and at least one memory including computer program code, the at least one memory and the computer program code configured to, with the at least one processor, cause the apparatus to perform at least the following: receive a storage status update from a dispenser adapted to store and dispense consumable items; determine, based on the received storage status update, whether a current storage status associated with the dispenser falls below a replenishment threshold; and upon determining that the current storage status falls below the replenishment threshold, present a notification indicating a suggestion to replenish the dispenser and a retailer located proximate to the apparatus at which additional consumable items are purchasable to replenish the dispenser. Alternatively, the at least one memory and the computer program code may be configured to, with the at least one processor, cause the apparatus to, instead of presenting the notification indicating the retailer located proximate to the apparatus, present a user interface adapted to allow online purchasing of the additional consumable items. In another alternative, the at least one memory and the computer program code may be configured, with the at least one processor, to provide the online purchasing options as an additional option to displaying a retailer located proximate to the apparatus.

According to a third aspect, a system can comprise the following: a communications network over which a storage status update is transmitted; a dispenser for storing and dispensing a plurality of consumable items; and a remote device adapted to execute an application. The application can be adapted to: receive the storage status update from the dispenser; and present a notification indicating a suggestion to replenish the dispenser based on the storage status update and a retailer located proximate to the remote device at which additional consumable items are purchasable to replenish the dispenser. Alternatively, the application can be adapted to present a user interface adapted to allow online purchasing of the additional consumable items via the remote device instead of presenting the notification indicating the retailer located proximate to the remote device. In another alternative, the application can be adapted to present the online purchasing option in addition to the notification suggesting a retailer located proximate to the remote device.

According to a fourth aspect, a computer-readable memory including computer executable instructions, the computer executable instructions, which when executed by a processor, cause an apparatus to perform a method comprising receiving, at a mobile device, a storage status update indicating a remaining quantity of a type of single serve coffee packs stored in a dispenser; updating a current storage status associated with the type of single serve coffee packs based on the received storage status update; determining whether the updated current storage status meets a predetermined threshold associated with the type of single serve coffees packs; and upon a determination that the updated current storage status of the dispenser meets the predetermined threshold associated with the type of single serve coffee packs, presenting a notification on the mobile device suggesting ordering an additional quantity of the type of single serve coffee packs and a proximately located retailer at which the additional quantity of the type of single serve coffee packs are purchasable. Alternatively, the computer executable instructions, which when executed by a processor, cause the apparatus to present a user interface adapted to allow online purchasing, via the mobile device, of the type of the single serve coffee packs suggested instead of presenting the notification with the suggestion of the proximately located retailer. In another alternative, the computer executable instructions, which when executed by a processor, can cause the apparatus to present the online purchasing option as well as the proximately located retailer.

According to a fifth aspect, a method comprises: receiving, at a mobile device, a storage status update indicating a remaining quantity of a type of single serve coffee packs stored in a dispenser; updating a current storage status associated with the type of single serve coffee packs based on the received storage status update; determining whether the updated current storage status meets a predetermined threshold associated with the type of single serve coffee packs; and upon a determination that the updated current storage status of the dispenser meets the predetermined threshold associated with the type of single serve coffee packs, presenting a notification on the mobile device suggesting ordering an additional quantity of the type of single serve coffee packs and a proximately located retailer at which the additional quantity of the type of single serve coffee packs are purchasable. The method can also comprise providing direction to the proximately located retailer. Alternatively, the method can comprise presenting a user interface adapted to allow online purchasing, via the mobile device, of the type of the single serve coffee packs suggested. In another alternative, the online purchasing option can be provided in addition to providing the proximately located retailer.

Additional features and/or aspects can include presenting a plurality of user interfaces associated with at least one of purchasing cross merchandise items, managing a user account, managing the storing of the items in the dispenser, in-aisle subscription and fulfillment, and presenting user-targeted information based on at least one of the times, the additional items, the cross merchandise items, purchase history associated with the user account, and/or additional information obtained from at least one social media outlet.

BRIEF DESCRIPTION OF THE DRAWINGS

For a more complete understanding of example embodiments, reference is now made to the following descriptions taken in connection with the accompanying drawings in which:

FIG. 1 illustrates an example dispenser in accordance with various embodiments of the present invention;

FIG. 2A is a frontal schematic view of the dispenser of FIG. 1;

FIG. 2B is an enlarged frontal schematic view of a portion of the dispenser of FIG. 1;

FIG. 2D is a side schematic view of the dispenser of FIG. 1;

FIG. 2E is an enlarged schematic view of a sensor aspect of the dispenser of FIG. 1;

FIG. 4A illustrates a first example of an operation performed by the system of FIG. 3;

FIG. 4B illustrates a second example of an operation performed by the system of FIG. 3;

DETAILED DESCRIPTION

Figure 2C:
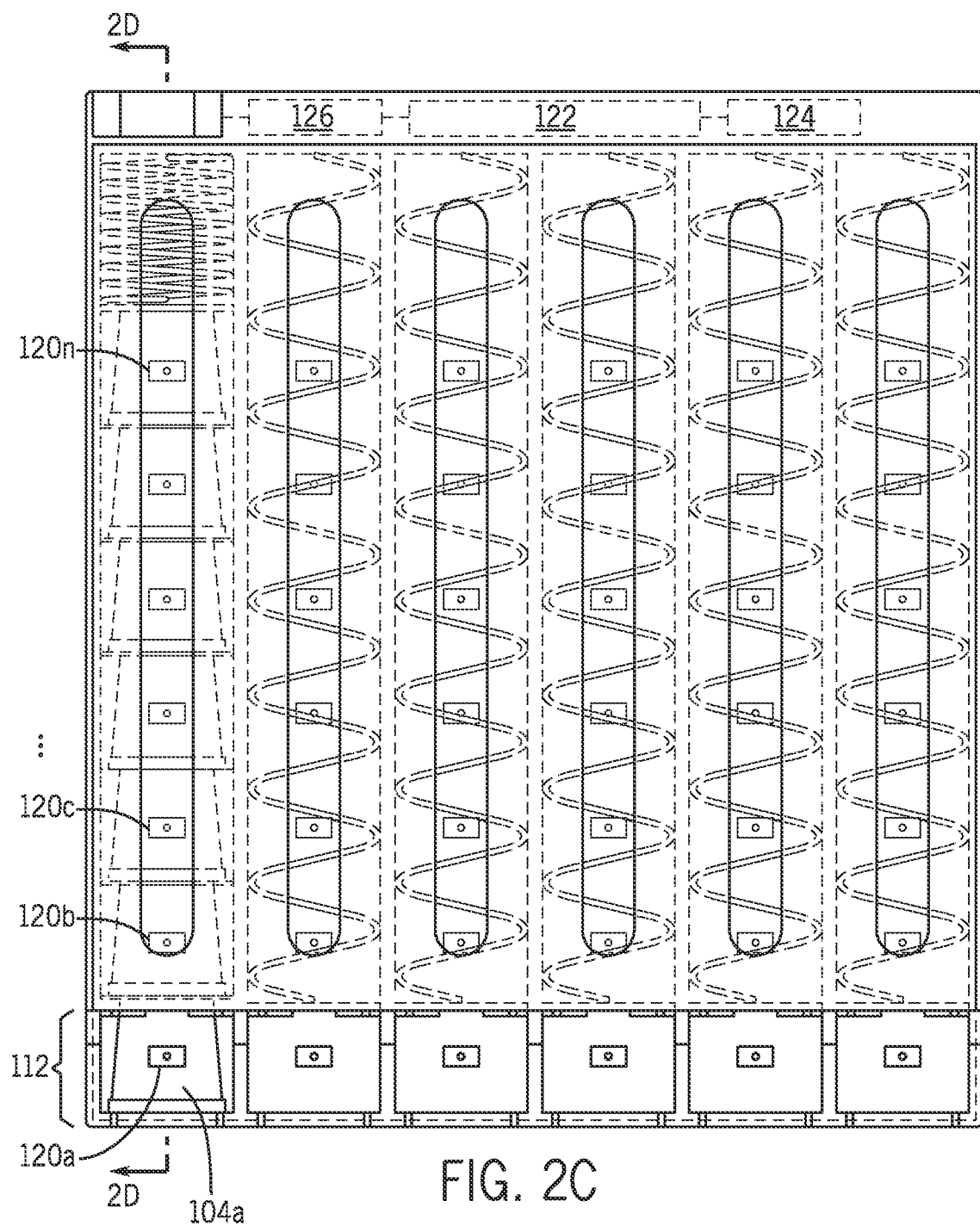
FIG. 2C is a front schematic view of the dispenser of FIG. 1.

The present disclosure is directed to eco-system enabled systems and methods for dispensing and monitoring the dispensing of consumable items, as well as a related application that can be executed on a computing device, such as a smart phone, to facilitate the replenishment of those consumable items. In accordance with one embodiment, the consumable items may be single serve coffee packs. For example, a dispenser, may be filled with single serve coffee packs. One or more sensors in the dispenser may be utilized to sense the removal of single serve coffee packs, until it is determined that the dispenser has reached a state where it should be replenished with additional single serve coffee packs. A related application implemented on a smart phone, for example, can notify a user of this state. The user may then choose to purchase additional single serve coffee packs via the related application. As will be described in greater detail, the related application may provide the user with various options regarding the purchase of additional single serve coffee packs, provide information regarding where additional single serve coffee packs can be purchased, suggest cross merchandise items, as well as other purchasing/ordering features that can result in the creation of a consumer-retailer ecosystem.

FIG. 1 illustrates an example dispenser 100 configured in accordance with various embodiments of the present disclosure. The dispenser 100 may include a housing 102 (or similar enclosure or structure) within which one or more single serve coffee packs 104a-104n can be stored. As shown in FIG. 1, single serve coffee packs 104a-104n can be stored in, e.g., a "stacked" formation within a channel 106a (or similar structure) of the dispenser 100. Additional channels 106b-106n can be utilized to store additional single serve coffee packs (not shown). As also shown in FIG. 1, each of channels 106a-106n can have a transparent window or viewing area through which a user may visually observe storage of the single serve coffee packs, for example.

Within each of channels 106a-106n, a spring may be used to provide resistance for pushing a plate 110a or similar structure against a single serve coffee pack to allow the user to retrieve the single serve coffee pack from a dispensing area 112. As shown in FIG. 1, channel 106a can contain spring 108a (illustrated in a compressed state against plate 110a), where single serve coffee packs 104a-104n occupy channel 106a. As a result of the force applied to plate 110a by spring 108a, single serve coffee pack 104a can be pushed into dispensing area 112. Once single serve coffee pack 104a is removed, spring 108a and plate 110a can push single serve coffee pack 104b into dispensing area 112. Another spring 108b within channel 106b is illustrated in a comparatively uncompressed state, when channel 106b is empty.

Additionally, and on the "face" of each channel 106a-106f in dispensing area 112, indicators 114 and 116 can be configured for visually indicating one or more states of dispenser 100, e.g., sensor operability, storage status, activation, etc. Moreover, dispenser 100 can include a communications status indicator 118 because, as alluded to previously, dispenser 100 may work with a related application to facilitate replenishment of dispenser 100. That is, dispenser 100 can communicate information over one or more networks regarding the storage state(s) of dispenser 100 to the related application to facilitate replenishment of dispenser 100. This functionality may be accomplished in accordance with one embodiment, by including a communications device 126, such as a wireless or wired transmitter, transceiver, radio, modem or similar device (as will be described in greater detail) in dispenser 100. Accordingly, communications status indicator 118 may indicate, e.g., whether an operative connection between the communications device 126 and the one or more networks exists.

FIGS. 2A-2E illustrate various views of a schematic representation of dispenser 100. In particular, FIG. 2A illustrates a bottom schematic view of dispenser 100, with area A indicating an enlarged bottom view illustrated in FIG. 2B. As alluded to previously, dispenser 100 may include indicators 114 and 116 for indicating, e.g., the storage state(s) of dispenser 100. That is, indicator 114 may be, e.g., a light emitting diode (LED) for indicating that a particular channel should be configured on the associated application. Indicator 116 may be, e.g., another LED for indicating that replenishment of a particular channel is needed/should be suggested. Indicator 118 may be, e.g. another LED for indicating the state of the connection between the dispenser 100 and one or more communications networks.

FIGS. 2C-2E illustrate the dispenser 100, with certain elements being shown in relief for ease of reference to other elements. FIG. 2C illustrates a front schematic view of dispenser 100, with the area denoted by arrows B indicating a side view illustrated in FIG. 2D. The area denoted by arrow D in FIG. 2D indicates an enlarged partial side view illustrated in FIG. 2E. As shown in FIGS. 2C-2E, one or more sensors 120a-120n may be located underneath or otherwise relative to positions/spaces where single serve coffee packs may be stored and dispensed.

In accordance with one embodiment, and as illustrated in FIGS. 2C-2E, there may be one sensor associated with each possible storage position or space such that each time a single serve coffee pack is placed in or dispensed from dispenser 100, an associated sensor 120a-120n can detect the presence or absence of the single serve coffee pack providing the dispenser 100 with a storage status. For example, if a threshold is met or surpassed, such as if four out of seven sensors indicate the lack of a single serve coffee pack, replenishment and/or refill may be suggested. In accordance with another embodiment, it is contemplated that, e.g., only a single sensor may be utilized in each channel of dispenser 100, such that the single sensor (at some predetermined position in the channel) no longer sensing a single serve coffee pack can be considered to be indicative that the threshold has been met. Upon meeting or surpassing the threshold, the related application (which can be updated with the storage status of dispenser 100) can recommend that additional single serve coffee packs be replaced in the dispenser 100 and or be purchased to replenish dispenser 100.

Sensors 120a-120n may be any type of sensor appropriate for sensing the presence or absence of single serve coffee packs, such as a presence sensor. Accordingly, sensors 120a-120n can be light-sensitive sensors, for example, which may sense presence based on the detection or absence of light. That is, single serve coffee pack 104b, for example, is shown to be occupying a position or space above sensor 120b, where single serve coffee pack 104b can block a certain amount of light from reaching sensor 120b. In the absence of that light, sensor 120b is aware of the presence of a single serve coffee pack. Alternatively, as another example, sensors 120a-120n can be pressure sensitive sensors which may sense presence based on whether not a single serve coffee pack is "felt" or is in contact with one or more of sensors 120a-120n.

Moreover, dispenser 100 may include at least one controller or processor 122 for controlling operation of and monitoring the aforementioned sensors, as well as for transmitting information about the storage status of dispenser 100 to the related application. For example, the at least one controller or processor 122 may monitor sensors 120a-120n. If the at least one controller or processor 122 receives information from, e.g., sensor 120c that there is no longer a single serve coffee pack sensed at that position, a storage status update may be transmitted to the related application.

In order to send the storage status update, as alluded to previously, dispenser 100 may utilize a transmitter, transceiver, radio, modem, or other communications device 126 working in conjunction with the at least one controller or processor 122. In accordance with one embodiment, communications device 126 may be a WLAN module. The WLAN module 126 can provide wireless communications between the dispenser 100 and a wireless AP, such as the wireless AP 312 shown in FIG. 3, over a wired communication network and/or to a wireless communication network in accordance with various networking protocols such a Wi-Fi™ communications standard. The WLAN module 126 can operate as a client to communicate with a wireless AP or as an AP itself to provide communications between other WLAN capable devices and a communication network. The WLAN module 126 may communicate with the mobile core network and/or the internet, through the wireless AP, via one or more links and/or associated devices as described in more detail below with regard to FIG. 3 for example. In this manner, the WLAN module 126 may provide network access to the dispenser 100 via the wireless AP enabling the dispenser 100 to communicate with a mobile device running an eco-system enabled application as described in more detail herein.

As previously described, the at least one controller or processor 122 can read presence sensors, e.g., sensors 120a-120n, and via communications device 126, may utilize a wireless wide area network (WWAN) for example, to communicate storage status updates to some remote location, in this instance, to a smart phone, without the need for a wired connection. The smart phone may itself, utilize an RF modem to transceive and process RF signals from the communications device 126, which in this instance, can be the aforementioned storage status updates regarding dispenser 100.

It should be noted that the dispenser 100 described and illustrated herein can be configured or implemented in different ways. For example, dispenser 100 can be configured to be oriented horizontally or vertically in use. Single serve coffee packs being stored in dispenser 100 may be stacked "end-to-end" as illustrated in FIGS. 1 and 2, or may alternatively be stacked "side-by-side," or in some other appropriate fashion. There may be more or less channels in which to store single serve coffee packs, and the channels themselves may be longer or shorter for storing more or less single serve coffee packs. Further still, the array(s) of sensors may be oriented in alternative positions relative to the single serve coffee packs, while an alternative mechanism(s) to springs may be utilized for progressing single serve coffee packs (with or without plates) along a channel to the dispensing area 112. Moreover, dispenser 100 can be configured to store and dispense other items such as cups, food products, or any other consumable item. These are merely exemplary modifications and/or variations contemplated in accordance with various embodiments, and are not meant to be limiting.

As described above, various embodiments allow for the use of a related application to facilitate replenishment of dispenser 100, where dispenser 100 can communicate with a mobile device, such as a smart phone, on which the related application may be executed. The at least one controller or processor 122 of dispenser 100 may send a storage status update to the related application implemented on the smart phone, allowing the related application to update quantity information. That is, the related application can be made aware of the quantity of single serve coffee packs in dispenser 100 by the user manually inputting the number of single serve coffee packs into the related application upon replenishing dispenser 100. Upon receiving storage status updates from dispenser 100, the related application can continuously decrement the original quantity of single serve coffee packs input by the user until the aforementioned threshold is met or surpassed. Alternatively, the related application may automatically receive the storage status of the dispenser 100 via storage status updates from dispenser 100 without any need for manual input from the user.

Accordingly, the related application can utilize one or more programs and/or algorithms for determining, e.g., when a notification or message should be sent to the user suggesting replenishing dispenser 100 with additional single serve coffee packs. For example, the abovementioned threshold may be set and utilized by the one or more programs and/or algorithms to determine when to send a notification or message suggesting replenishment of dispenser 100. The one or more programs or algorithms may be stored as part of the related application or in one or more memory units resident in the smart phone, and executed via one or more controllers or processors also resident in the smart phone. As yet another alternative, the one or more programs or algorithms may be resident on a host server or other computing entity which may host/control the related application, e.g., such as if the related application is a web-based application, an instance of which may be implemented and executed in the smart phone.

Predictive calculations and/or determinations may be applied in accordance with various embodiments as well. For example, the one or more programs may learn over time if certain flavors of single serve coffee packs are dispensed more quickly than others, resulting in the triggering of flavor-specific notifications or messages. That is, a notification or message may be sent when four single serve coffee packs of a first flavor remain in dispenser 100, whereas a notification or message may be sent when only two single serve coffee packs of a second flavor remain in dispenser 100. Various programs, algorithms, calculations, data, etc. may be utilized, factored, weighted, and/or analyzed to effectuate the triggering of one or more notifications or messages to the user to replenish dispenser 100 in accordance with various desired modes or methods of operation.

It should be noted that in accordance with alternative embodiments of the present disclosure, the at least one controller or processor 122 may itself include and/or access one or more programs or algorithms for controlling the sending of a notification or message. That is, and instead of transmitting storage status updates to the related application, the at least one controller or processor 122 can keep track of the storage status of dispenser 100 itself, determine when and if a threshold has been met or surpassed, and transmit an instruction to the related application to suggest replenishment to the user.

In the above alternative embodiment, the one or more programs or algorithms may be stored in a memory unit 124 or as part of/within the at least one controller or processor 122. The one or more programs or algorithms may instruct the at least one controller or processor 122 as to which sensor(s) triggers the notification or message sent via communications device 126, using data contained in, e.g., a lookup table or the like (which may be stored in memory unit 124, or again, as part of the at least one controller or processor 122).

For example, the at least one controller or processor 122 may monitor sensors 120a-120n. If the at least one controller or processor 122 receives information from, e.g., sensor 120c that there is no longer a single serve coffee pack sensed at that position, an instruction may be sent to the related application instructing the related application to notify the user to replenish dispenser 100.

Figure 3:
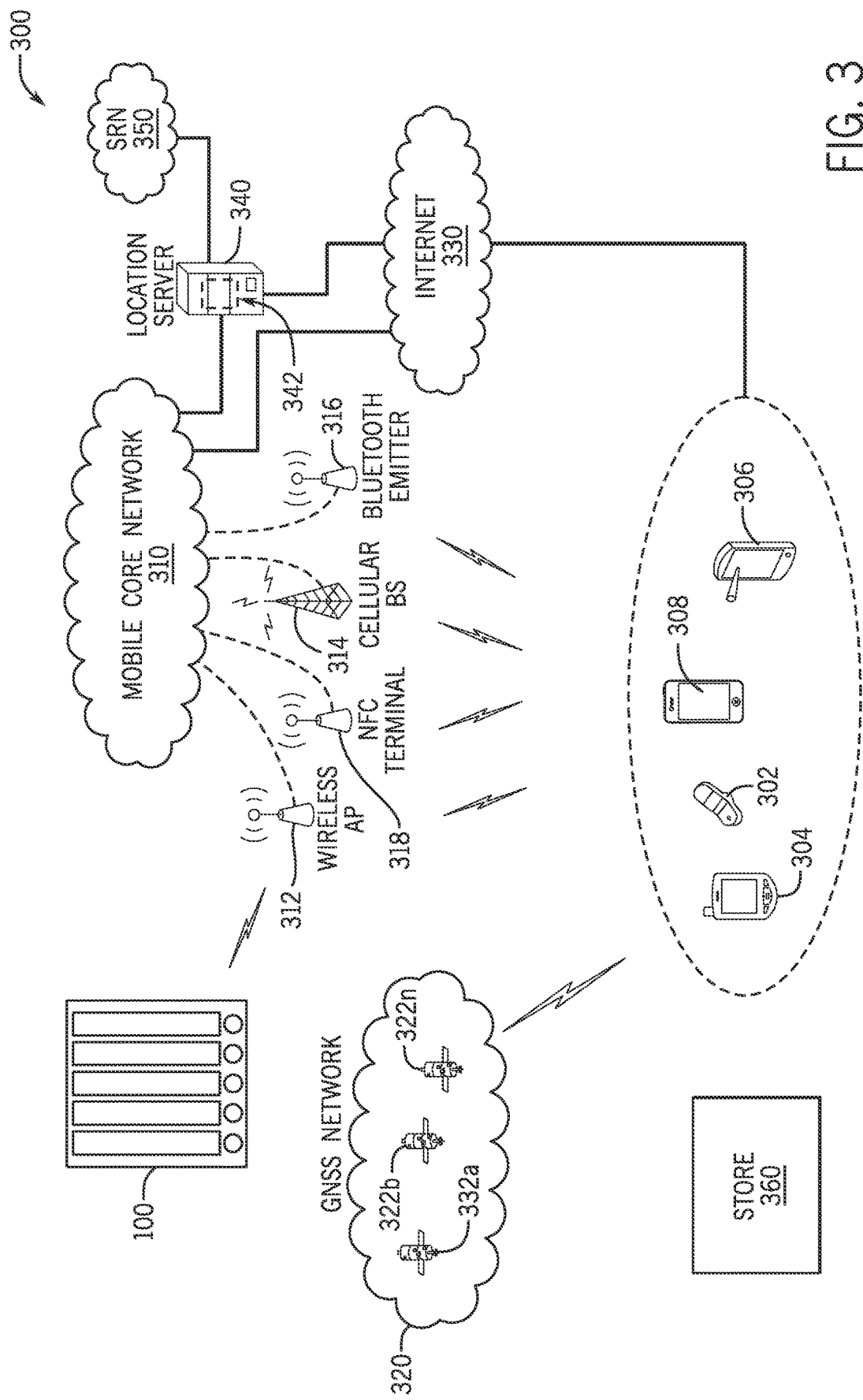
FIG. 3 illustrates an example system in which a dispenser and associated application interact via a network to facilitate replenishment of the dispenser in accordance with various embodiments.

FIG. 3 is a block diagram illustrating an exemplary communication system in which various embodiments may be implemented in accordance with the present disclosure. Referring to FIG. 3, there is shown a communication system 300 which includes a plurality of mobile devices, of which the mobile devices 302-308 are illustrated. One or more of the illustrated mobile devices 302-308 can include an eco-system enabled application or applications according to various embodiments described in more detailed herein. Exemplary mobile devices may include a cellular device 302, a personal digital assistant (PDA) 304, a tablet computer 306, and/or a Smartphone 308. Also shown in the communication system 300 is a mobile core network 310, a wireless access point (AP) 312, a cellular base station (BS) 314, a Bluetooth® emitter 316, a Near Field Communication (NFC) terminal 318, a GNSS network 320, a plurality of GNSS satellites 322a-322n, an internet 330, a location server 340, and a satellite reference network (SRN) 350. One or more of the mobile core network 310, wireless AP 312, cellular BS 314, Bluetooth® emitter 316, NFC terminal 318, GNSS network 320, GNSS satellites 322a-322n, internet 330, location server 340, and/or satellite reference network (SRN) 350 can be used in assisting to determine the location of one or more of the mobile devices 302-308 for use in the eco-system enabled application and/or to provide communications links to the mobile devices 302-308 for allowing the mobile devices 302-308 to communicate as described in more detail herein with respect to an eco-system enabled application.

The wireless AP 312 may include suitable logic, circuitry, interfaces, and/or code that are operable to provide data services to communication devices, such as one or more of the mobile devices 302-308, in adherence with one or more wireless LAN (WLAN) standards such as, for example, IEEE 802.11, 802.11a, 802.11b, 802.11d, 802.11e, 802.11n, 802.11 ac, 802.11v, and/or 802.11u. The wireless AP 312 may communicate with the mobile core network 310 and/or the internet 330, via one or more links and/or associated devices for example. In this manner, the wireless AP 312 may provide network access to the mobile devices 302-308. The wireless AP 312 may also communicate with the dispenser 100 and provide the dispenser 100 the ability to communicate with the mobile devices 302-308, via the mobile core network 310 and/or the internet 330. In this manner, the dispenser 100 can provide storage status updates to a mobile device running the eco-enabled application, such as Smartphone 308.

The cellular BS 314 may include suitable logic, circuitry, interfaces, and/or code that are operable to provide voice and/or data services to communication devices, such as one or more of the mobile devices 302-308, in adherence with one or more cellular communication standards. Exemplary cellular communication standards may include Global System for Mobile communications (GSM), General Packet Radio Services (GPRS), Universal Mobile Telecommunications System (UMTS), Enhanced Data rates for GSM Evolution (EDGE), Enhanced GPRS (EGPRS), and/or 3GPP Long Term Evolution (LTE). The cellular BS 314 may communicate with the mobile core network 310 and/or the internet 330, via one or more backhaul links and/or associated devices for example. In this manner, the cellular BS 314 may provide network access to the mobile devices 302-308, enabling a mobile device running the eco-enabled application, such as Smartphone 308, to communicate with the dispenser 100.

The Bluetooth® emitter 316 may include suitable logic, circuitry, interfaces, and/or code that are operable to provide Bluetooth® based connectivity to communication devices, such as one or more of the mobile devices 302-308, in adherence with various Bluetooth® and/or Bluetooth® Low Energy (BLE) standards. The Bluetooth® emitter 316 may communicate with the mobile core network 310 and/or the internet 330, via one or more backhaul links and/or associated devices for example. In this manner, the Bluetooth® emitter 316 may provide network access to the mobile devices 302-308, enabling a mobile device running the eco-enabled application, such as Smartphone 308, to communicate with the dispenser 100.

The NFC terminal 318 may include suitable logic, circuitry, interfaces, and/or code that can provide NFC-based connectivity to communication devices, such as one or more of the mobile devices 302-308, in adherence with various short range communication standards such as the Near Field Communications standards. The NFC terminal 318 may communicate with the mobile core network 310 and/or the internet 330, via one or more backhaul links and/or associated devices for example. In this manner, the NFC terminal 318 may provide network access to the mobile devices 302-308. One example implementation of an NFC terminal 119 is for use in a contactless payment system.

The mobile core network 310 may include suitable logic, circuitry, interfaces, and/or code that are operable to provide interfacing and/or connectivity servicing between access networks, which may be utilized by the mobile devices 302-308, and external data networks such as packet data networks (PDNs) and/or the internet 330. The mobile core network 310 may correspond to one or more service providers that provide, control, and/or manage network accessibility available via the mobile devices 302-308. In this regard, the mobile devices 302-308 may access the mobile core network 310 via the wireless AP 312, the cellular BS 314, the Bluetooth® emitter 316, and/or the NFC terminal 318. The mobile core network 310 may communicate various data services, which are provided by external data networks, to associated user devices such as, for example, the mobile devices 302-308. In an exemplary aspect of the disclosure, in instances where an eco-system application is provided to a user device such as Smartphone 308, the mobile core network 310 may be operable to communicate with the location server 340 to obtain location information that can be used by the eco-system enabled application.

Each of the mobile devices 302-308 may include suitable logic, circuitry, interfaces, and/or code for implementing various aspects of the embodiments disclosed herein. In this regard, each of the mobile devices 302-308 may be operable to communicate via a plurality of wired and/or wireless connections. Each of the mobile devices 302-308 may be operable, for example, to transmit to and/or receive signals from one or more of the wireless AP 312, the cellular BS 314, the Bluetooth® emitter 316, NFC terminal 318, the GNSS network 320, and/or the internet 330. Also, each of the mobile devices 302-308 may be operable to communicate with, and/or receive services provided by the internet 330 and/or the mobile core network 310. In this regard, the mobile devices 302-308 may be operable to utilize eco-system applications, which can utilize the location server 340.

The GNSS network 320 may include suitable logic, circuitry, interfaces, and/or code that may provide navigation information to land-based devices via satellite links. In this regard, the GNSS network 320 may include, for example, the plurality of GNSS satellites 322a-322n, each of which is operable to provide satellite transmissions based on a global navigation satellite system (GNSS). Exemplary GNSS systems may include, for example, GPS, GLONASS, Galileo-based satellite system, Beidou and/or Compass systems. Accordingly, the GNSS network 320 may be operable to provide positioning information via downlink satellite links transmitted from one or more of the plurality of GNSS satellites 322a-322n to enable land-based devices, such as the mobile devices 302-308, to determine their locations. The plurality of GNSS satellites 322a-322n may directly provide positioning information and/or a land-based device may utilize satellite transmissions from different satellites to determine its location using, for example, triangulation based techniques.

The SRN 350 may include suitable logic, circuitry, interfaces, and/or code that are operable to collect and/or distribute data for GNSS satellites on a continuous basis. The SRN 350 may include a plurality of GNSS reference tracking stations located around the world to provide A-GNSS coverage all the time in both a home network and/or any visited network. In this regard, the SRN 350 may utilize satellite signals received from various GNSS constellations, such as, for example, the plurality of GNSS satellites 322a-322n of the GNSS network 320.

The location server 340 may include suitable logic, circuitry, interfaces, and/or code that are operable to provide and/or support location based services (LBS). In this regard, the location server 340 may be operable to store and/or process location related information pertaining to communication devices in the system 300, such as one or more of the mobile devices 302-308. The location information may be stored in a location reference database 342 in the location server 340. The location server 340 may be operable to collect and/or retrieve location information from communication devices. The location server 340 may also be operable to access additional and/or dedicated entities, such as the SRN 350 for example, to collect GNSS satellite data, and may be operable to utilize the collected GNSS satellite data to generate GNSS assistance data (A-GNSS data) including, for example, ephemeris data, long term orbit (LTO) data, reference positions and/or time information. The location server 340 may communicate the stored location data when requested to do so.

In operation, the location server 340 may be utilized to provide location based services (LBS) in the system 300, such as locating and/or providing directions to a nearby store, e.g., store 360. The location server 340 may maintain, for example, the location reference database 342, which may include elements corresponding to each of the mobile devices 302-308. The location server 340 may access the SRN 350 to collect GNSS satellite data, and may utilize the collected GNSS satellite data to generate GNSS assistance data (A-GNSS data) pertaining to the mobile devices 302-308. The location server 340 may also collect and/or retrieve location information directly from the mobile devices 302-308, and/or from other associated entities that interact with the mobile devices 302-308 in the system 300, such as, for example, the wireless AP 312, the cellular BS 314, the Bluetooth® emitter 316, and/or the NFC terminal 318. The retrieved location information may be stored in the location reference database 342 in the location server 340. The location server 340 may communicate the stored location data, e.g., when requested to do so. The location reference database 342, maintained in the location server 340, may be modified, refined, and/or updated using retrieved location information. The location information stored and/or maintained by the location server 340 may be utilized to augment and/or substitute for location information received and/or generated based on communication with the GNSS network 320, for example, when communication with the GNSS network 320 is disturbed.

The location data may also be locally generated, and/or maintained thereafter by devices and/or entities other than the location server 340. In this regard, location related data, which typically may be generated and/or maintained by the location server 340, may be locally generated, maintained, and/or used by the mobile devices 302-308, and/or by service providers thereof. Accordingly, devices and/or entities that typically may be serviced by the location server 340, such as the mobile devices 302-308, may also perform location related servicing locally. Furthermore, the locally generated and/or maintained location related data may be uploaded from the mobile devices 302-308, and/or service providers thereof, to the location server 340. Uploading the location related data may be performed periodically, on request, and/or based on configuration of the client devices or entities, and/or the location server 340 itself.

The location information stored and/or maintained in the location server 340 may be utilized to authenticate, for example, one or more of the mobile devices 302-308, users thereof, and/or locations thereof during operations performed by the mobile devices 302-308. In this regard, service providers, who may provide access servicing to the mobile devices 302-308, may contact the location server 340 to request that the location server 340 perform authentication procedures, and/or to obtain information necessary for performing the authentication procedures. The service providers may include, for example, cellular, Bluetooth®, WLAN, and/or NFC services providers. For example, a service provider of one of the mobile devices 302-308 may request authenticating the mobile device, its user, and location at a given instance. The location server 340 may then perform the necessary authentication procedures, which may be based on existing information in the location reference database 342, which is maintained by the location server 340. The location server 340 may also perform authentication procedures based on current information, which may be obtained by, for example, communicating with the mobile device, to verify its present location and/or connectivity status or parameters. In this regard, the location server 340 may communicate with the mobile device using IP packets that may be communicated via the internet 330, which may be transmitted to and/or received by the mobile device via its internet connectivity, and/or via its network access via the wireless AP 312, the cellular BS 314, the Bluetooth® emitter 316, and/or NFC terminal 318.

The internet 330 may include a system of interconnected networks and/or devices that enable exchange of information and/or data among a plurality of nodes, based on one or more networking standards, including, for example, Internet Protocol (IP). The internet 330 may enable, for example, connectivity among a plurality of private and public, academic, business, and/or government nodes and/or networks, wherein the physical connectivity may be provided via the Public Switched Telephone Network (PSTN), utilizing copper wires, fiber-optic cables, wireless interfaces, and/or other standards-based interfaces.

Various devices and/or user identification information may be utilized during network access and/or communications, which may be structured, allocated, and/or assigned based on the specific wired and/or wireless protocols that are used to facilitate any such network access and/or communication. For example, in GSM and/or WCDMA based networks, International Mobile Equipment Identity (IMEI) parameters may be utilized to uniquely identify mobiles devices, and these IMEI parameters may also be used and/or traced back to the mobile devices' users. Service providers may utilize the device and/or user identification information to track mobile devices and/or users. The service providers may track devices and/or users for various reasons, including, for example, billing or usage monitoring, and/or to help locate mobile devices, and/or their users, in cases of emergency and/or law enforcement purposes. Tracking of devices may also be used to provide authorized LBS and/or real-time device location information which can be utilized by eco-system enabled applications, such as exemplary embodiments of eco-system enabled applications according to the present disclosure, running on the mobile device or other devices and/or systems.

As described above, system 300 may enable dispenser 100 and smart phone 308 to communicate over the mobile core network 310 or internet 330, for example, to exchange notifications or messages regarding storage status of dispenser 100 or indications to suggest replenishment to a user of smart phone 308, as previously described.

In accordance with one embodiment, and with reference to FIGS. 4A-4G, system 300 can operate as follows. Dispenser 100 can be connected to a user's home Wi-Fi network, and the user can utilize dispenser 100 to store and dispense single serve coffee packs. Dispenser 100 may further be paired or associated with a related application that can be run on a mobile device, such as the user's smart phone. For example, the related application may include configuration options, such as a configuration graphical user interface (GUI) that the user can utilize to input, e.g., an identification code associated with dispenser 100. It should be noted that the related application can also be designed for use with multiple dispensers.

Upon filling dispenser 100 with a desired amount of single serve coffee packs, the user can manually input the quantity and type of single serve coffee packs stored in each channel of dispenser 100. Each channel of dispenser 100 can be filled with a different type, e.g., flavor, of single serve coffee packs, or multiple channels can be utilized for the same type of single serve coffee pack. As illustrated in FIG. 4A, upon pairing dispenser 100 with the related application, and upon the user entering the requisite information regarding what type and quantity of single serve coffee packs are currently stored in dispenser 100, the related application can provide a visual display or representation of dispenser 100. That is, display 410 of smart phone 308 can show the user how many of each type of single serve coffee packs are currently stored in dispenser 100, e.g., 7 cups of "Flavor A," 2 cups of "Flavor B," and so on.

Alternatively, and as described above, dispenser 100 can automatically provide a storage status update to the related application indicating the storage status of dispenser 100. For example, each channel of dispenser 100 may be predetermined to store a different type of single serve coffee pack, such that when a channel is replenished with single serve coffee packs, the related application receives a storage status update from dispenser 100 indicating how many single serve coffee packs are currently stored therein based on reading/monitoring the aforementioned sensors located in each channel. Alternatively still, the different types of single serve coffee packs may be imprinted or otherwise identified with specific codes, such as bar codes, indicating the type of single serve coffee pack. In such an embodiment, the sensors utilized in dispenser 100 may be configured to read such codes to automatically identify the type of single serve coffee pack being stored in a particular position or space.

The related application, which can be, e.g., a web-based application or a standalone application installed on the user's smart phone 308 (and/or on the user's personal computer (PC), tablet PC, etc.), can receive storage status updates regarding the quantity of single serve coffee packs currently in dispenser 100 as single serve coffee packs are subsequently dispensed. As described above, and when a threshold for replenishment of one or more types of single serve coffee packs is met or surpassed, the related application can inform the user of this condition. As illustrated in FIG. 4B, the related application may display a message 412 to the user indicating that, e.g., a certain type of single serve coffee pack is out, or running low.

As further illustrated in FIG. 4B, the message 412 may also include an indication of where the user may purchase additional single serve coffee packs to replenish dispenser 100. That is, the related application can leverage existing location-based services/applications and/or functionality resident on or accessible by smart phone 308 to locate a "nearest" store or retailer. For example, smart phone 308 may include a GPS tracking device capable of determining a location of the smart phone 308. Once the location of the smart phone 308 is determined, the related application can utilize, e.g., internet-based mapping services, resident on smart phone 308 or implemented within the related application to determine one or more stores near the location of the smart phone 308. Again leveraging the internet-based mapping services, the related application can also provide directions to the store 360.

Additionally still, the related application can be linked to informational resources or similar data repositories from which information regarding inventory of a particular retailer can be obtained. That is, and in accordance with one embodiment, the related application can be associated with a particular retailer. In accordance with another embodiment, however, and so long as the related application has access to the aforementioned informational resources or data repositories of multiple retailers, the related application can provide the user with suggestions for one or more nearby retailers that are not necessarily related/the same. Accordingly, and referring back to FIG. 3, the message 412 may indicate to the user that store 360 has the one or more types of single serve coffee packs in stock.

Figure 4C:
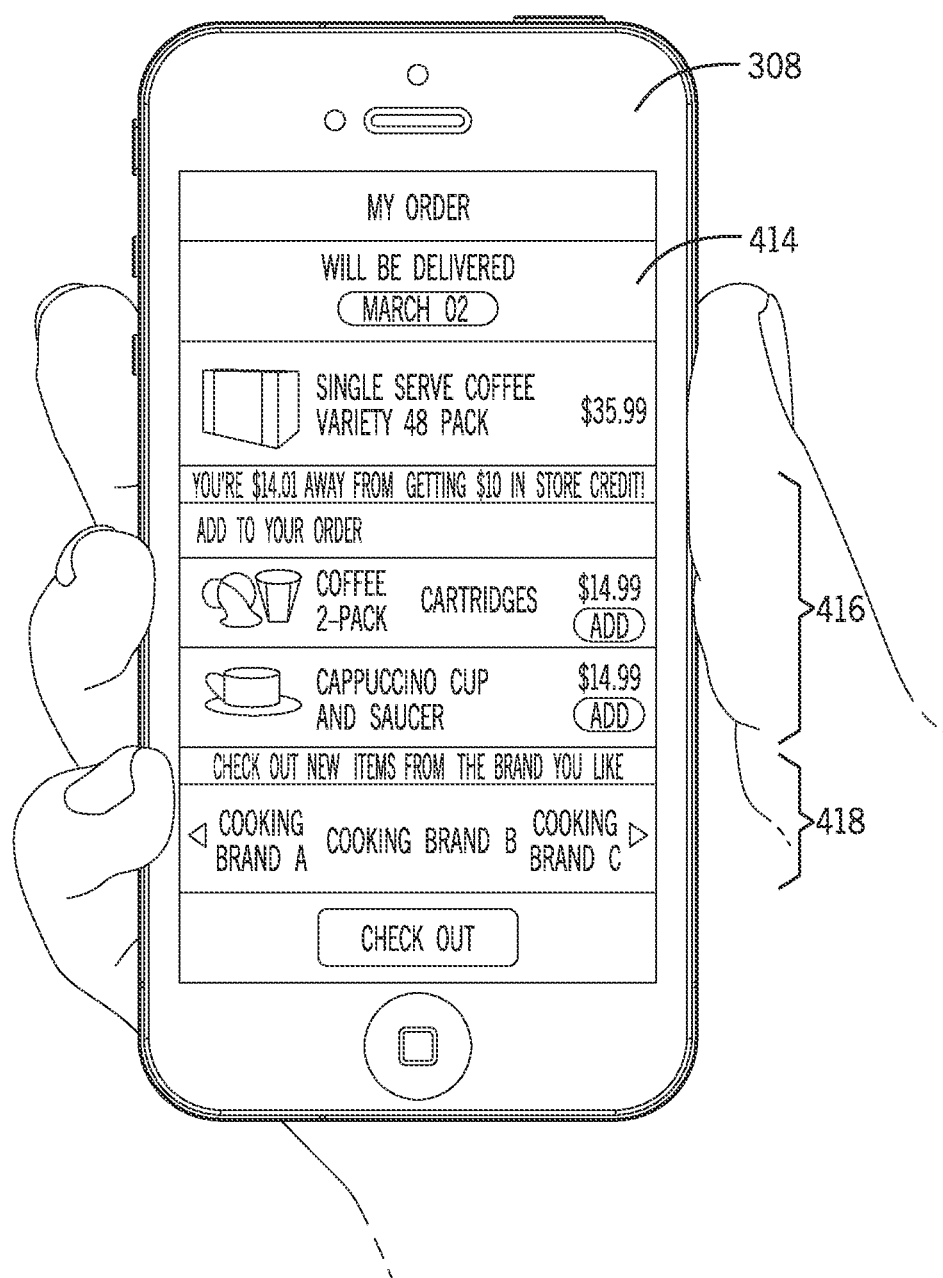
FIG. 4C illustrates a third example of an operation performed by the system of FIG. 3.

In addition to merely providing message 412 to the user suggesting replenishment of dispenser 100, and e.g., a nearby retailer where single serve coffee packs can be purchased, the related application may also provide the user with additional options for purchasing single serve coffee packs. That is, the related application may provide a phone number the user can dial to call the retailer to place an order, or alternatively, an ordering GUI that allows the user to order single serve coffee packs using the smart phone 308. In this way, the user can engage in remote or "online" ordering of single serve coffee packs, and have the ordered single serve coffee packs ready for pick up, rather than engaging in a conventional in-store checkout procedure. For example, the user can simply enter payment information, or the user may have payment information stored in an account accessible by the related application and, e.g., associated with the particular retailer from which the single serve coffee packs are ordered. Alternatively still, the ordering GUI may provide an option to allow the user to have the ordered single serve coffee packs delivered to a location of the user's choosing. As illustrated in FIG. 4C, the related application can display an order confirmation 414 on smart phone 308. It should be noted that if the user wishes to disregard the suggestion to purchase additional single serve coffee packs to replenish dispenser 100, the user may acknowledge the notification or message, but opt not to order additional single serve coffee packs. Accordingly, the related application may at some predetermined later time, remind the user by sending another notification or message.

As further illustrated in FIG. 4C, the related application can present cross merchandise ordering options 416 to the user. That is, and as described above, the user may have an account associated with a particular retailer that the related application can access or that with which the related application is itself associated. Accordingly, the related application, upon analyzing the purchasing or order history of the user, can suggest additional items to the user for purchase. Such additional items can be related to the single serve coffee packs, such as coffee cartridges or coffee drinking utensils, such as a cappuccino cup and saucer. Other cross merchandising options at 418 can involve presenting the user with the opportunity to obtain information or browse items for sale associated with other "cooking" brands, not necessarily limited to coffee-related items or brands.

Figure 4D:
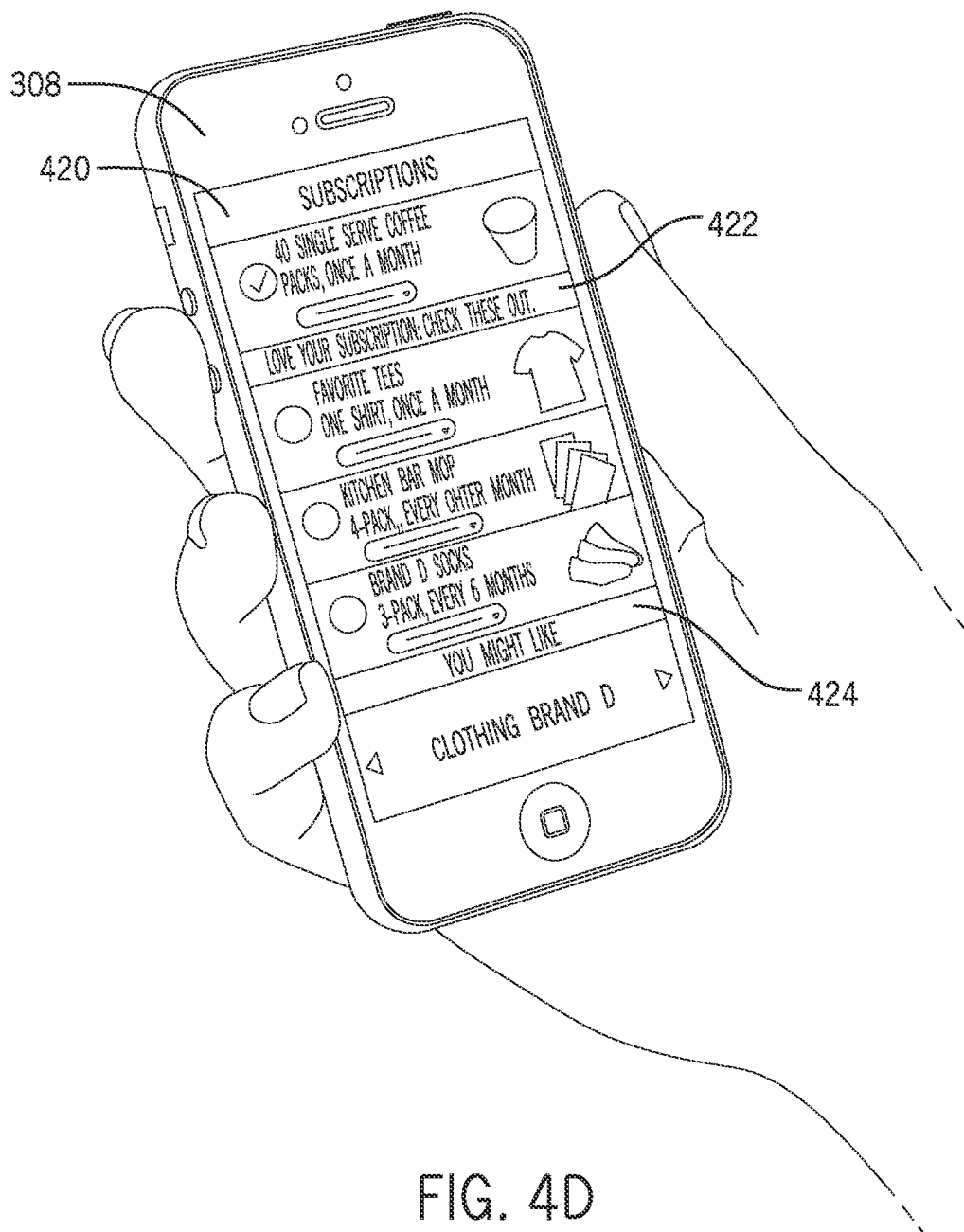
FIG. 4D illustrates a fourth example of an operation performed by the system of FIG. 3.

Additionally still, and as illustrated in FIG. 4D, the related application can provide subscription opportunities 420 for the user to engage in. That is, and illustrated in FIG. 4D, the user can become a member of a subscription service for the single serve coffee packs so that the user can automatically receive some predetermined amount and/or type of single serve coffee packs, e.g., once a month, every week, etc. Management of the subscription can be provided through the related application via a subscription management GUI(s). The user may sign up for and/or manage other subscriptions as well. For example, and if the subscription for the single serve coffee packs is provided through a department store retailer, the user may sign up for subscriptions for other cross merchandise items 422 sold by the department store retailer, such as clothing, kitchen supplies, etc. As well, and when managing one or more subscriptions, the user may again be provided with still other cross merchandise options or information 424 regarding, e.g., other lifestyle brands, that the user may potentially have an interest in, membership rewards, etc.

Figures 4E, 4F, 4G:
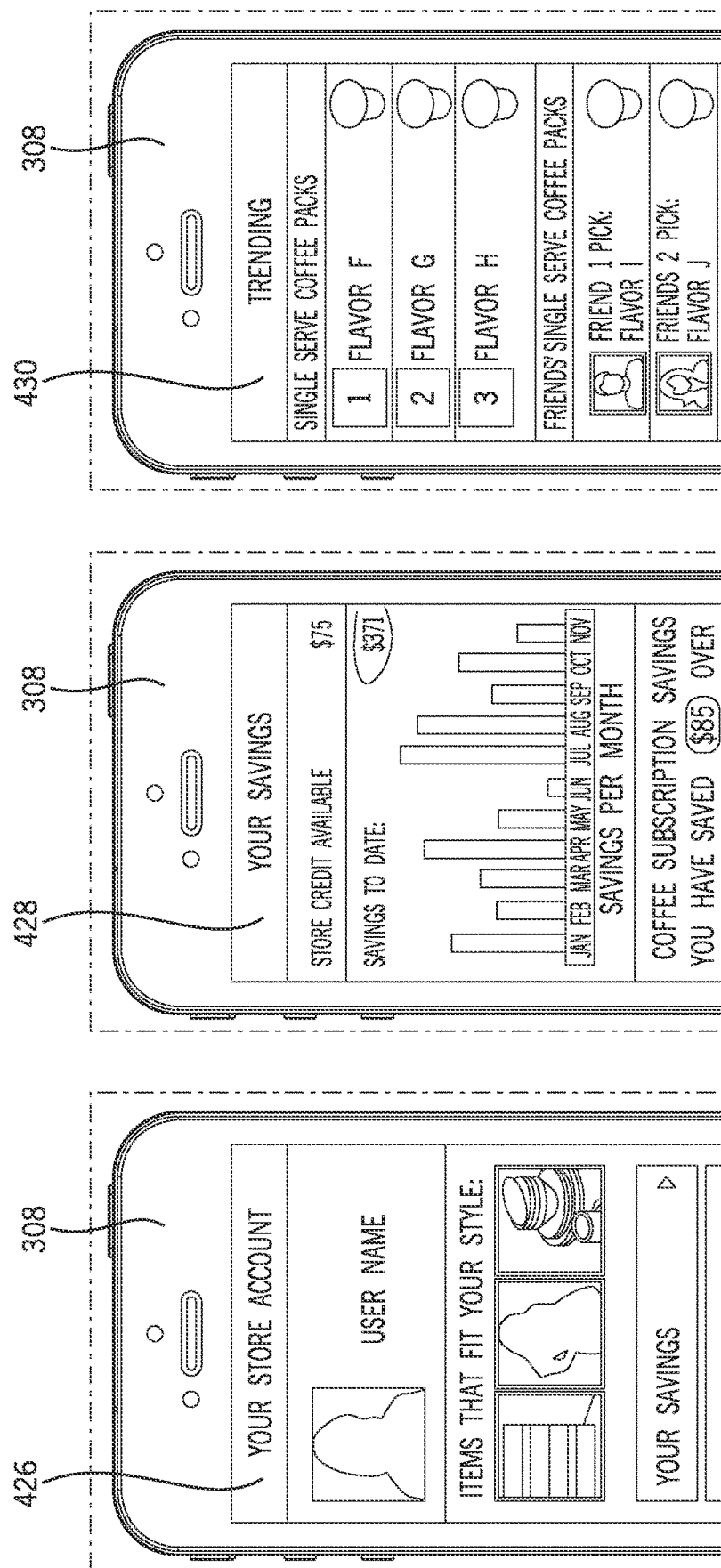
FIGS. 4E, 4F, and 4G illustrate other examples of operations performed by the system of FIG. 3.

FIGS. 4E, 4F, and 4G illustrate other capabilities of the related application. For example, the related application may present a "dashboard" GUI 426 to the user as shown in FIG. 4E, from which the user can access and/or edit their account, purchase history, reserved items for later purchasing, control and/or interact with the various options, features, and/or functionalities provided by the related application, and from which other cross merchandise options or information can be presented. For example, a GUI illustrating presenting the user's accumulated savings and/or available store credit from a particular retailer can be presented in FIG. 4F at 428.

Another aspect of the related application is that it can leverage information gleaned from, e.g., social media outlets, to effectuate social merchandising, trending, etc. For example, when establishing an account with a particular retailer, the user may choose to identify a social media network, such as Facebook®, Pinterest™, Tumblr™, etc., and allow the related application to access certain information and/or statistics that appear on or are associated with the user's Facebook® page or account as shown in FIG. 4G at 430. Thus, the related application may become aware of, e.g., what single serve coffee packs the user's "Facebook® friends" may have "Liked" and provide such information to the user, such as ranking of the single serve coffee packs "Liked" by the user's "Facebook® friends." Allowing the user access to such information can be useful in replenishing dispenser 100 prior to a party, for example, to better accommodate the tastes/preferences of the user's friends. Likewise, the user may allow certain aspects of his/her purchase history to be accessed by such social media outlets, allowing other users that utilize the same or a related application to glean similar information from the user.

It should be noted that the above example features and functionalities of the related application are merely exemplary and not meant to be limiting. Moreover, like the one or more programs or algorithms described above for determining when a notification or message should be sent to the user suggesting replenishment of the single serve coffee packs, additional programs and/or algorithms can be utilized to perform the analysis of the user's purchasing or order history, perform statistical and/or social media outlet information gathering, etc. to provide targeted cross merchandise options, relevant coupons or offers, targeted advertising, product testing, etc. as described above, as is contemplated in accordance with various embodiments.

Figure 5:
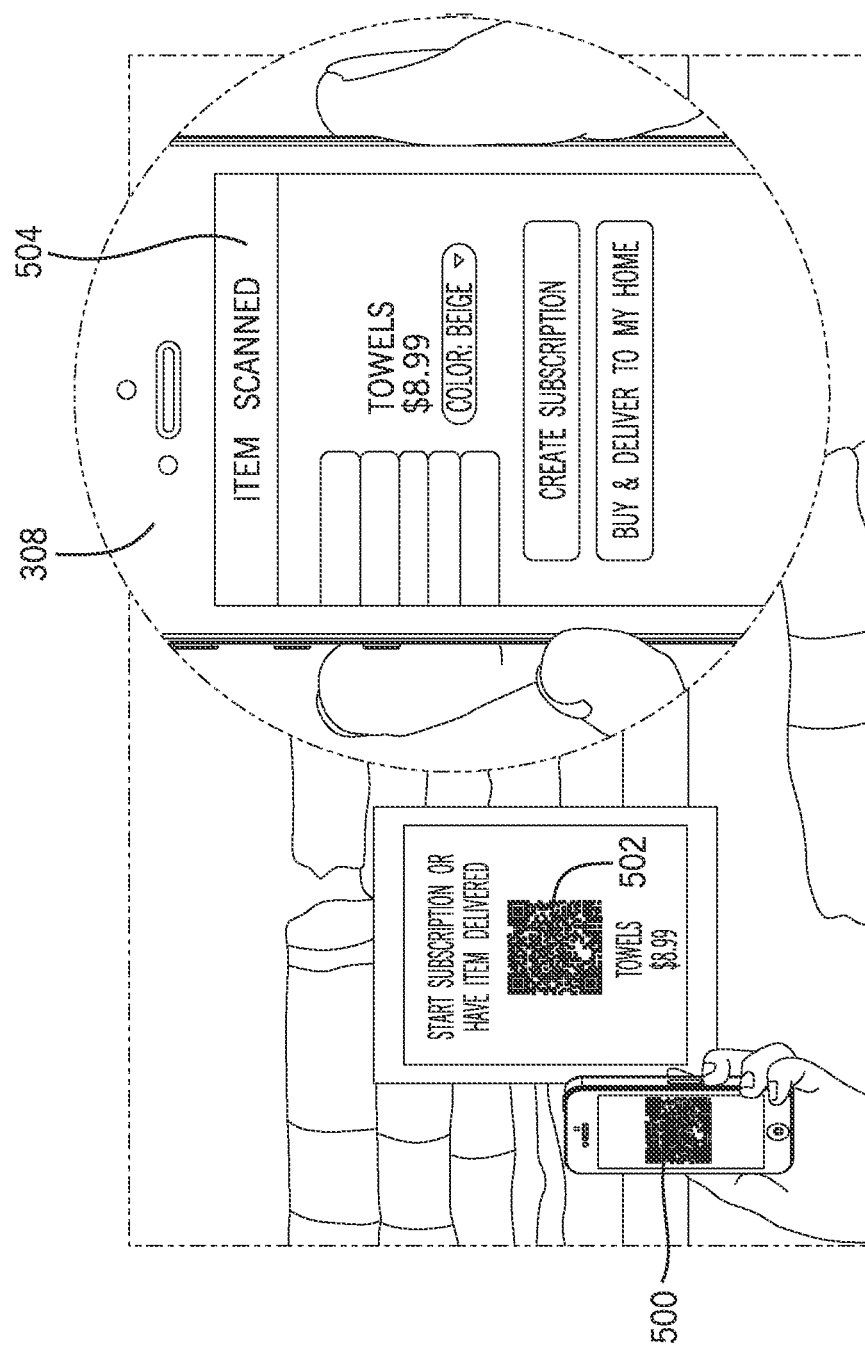
FIG. 5 illustrates an example in-aisle aspect of the system of FIG. 3.

FIG. 5 illustrates yet another feature of the related application regarding "in-aisle" subscription and/or fulfillment, where the related application can be used to scan, at 500, a product code 502 associated with an item(s) for sale at a retail location. Upon scanning the product code 502 associated, in this example, with towels, the related application presents an in-aisle GUI 504 that allows the user to select purchase options for those towels. That is, the user can choose to create an ordering subscription for the towel, or the user can choose to purchase the towels for delivery to the user's home. This can be useful when the user wishes to see/sample a product before purchasing, for example, but prefers to avoid conventional checkout procedures and/or prefers home delivery of their purchases.

Figure 6:
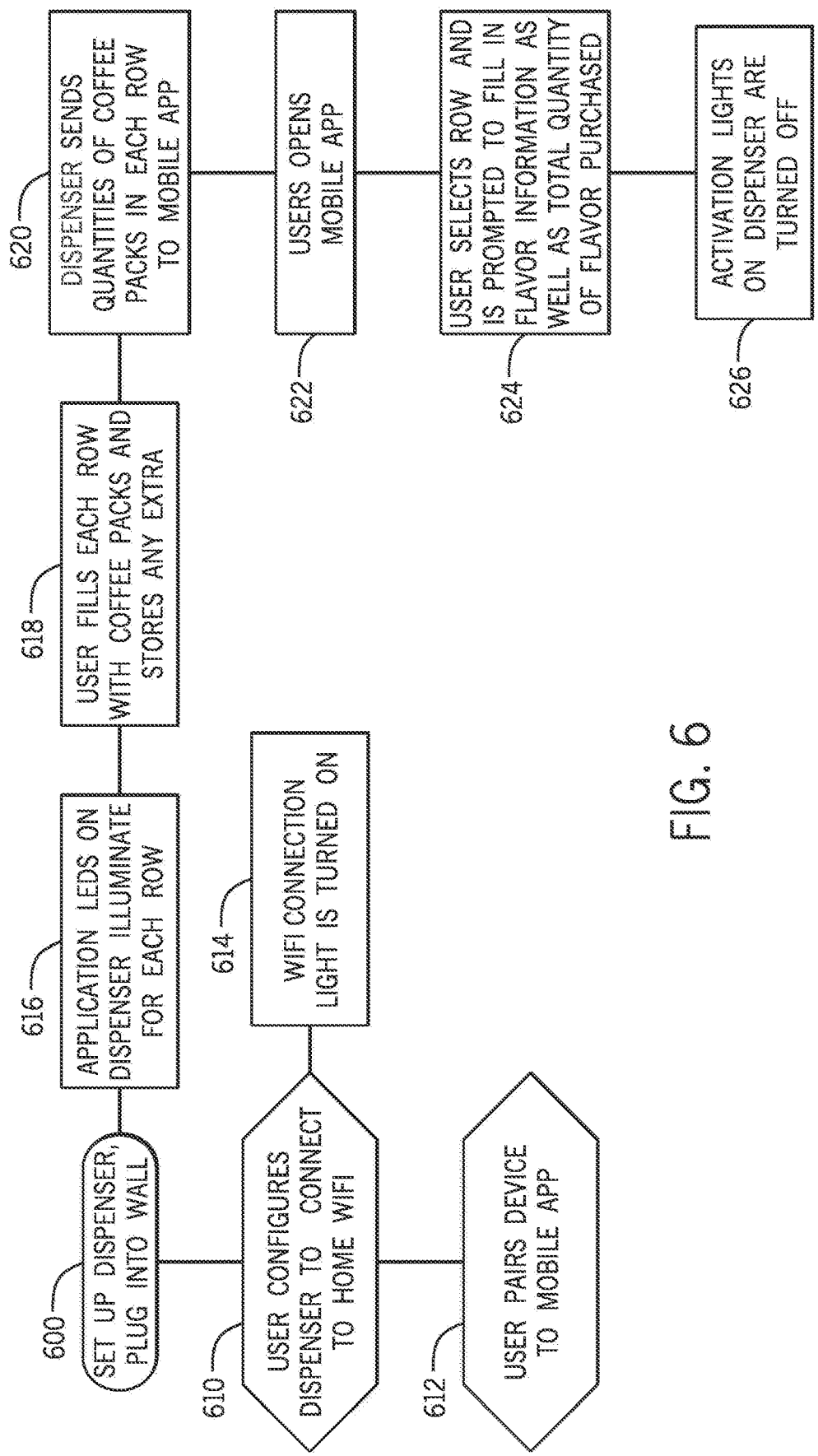
FIG. 6 illustrates example processes performed in accordance with various embodiments for configuring and setting up a dispenser and related application.

FIG. 6 is a flow chart illustrating example processes for setting up the dispenser 100 performed in accordance with various embodiments as described above. The process of setting up the dispenser 100 begins with plugging the dispenser 100 into a power outlet 600. Alternatively, the dispenser 100 can be battery operated. After the dispenser 100 is powered up, the user configures the dispenser to connect to the user's home Wi-Fi network 610 and pairs the device to a mobile app 612. Once the dispenser 100 is connected to the user's home Wi-Fi_33 network indicator 118 should light up indicating that the dispenser 100 is connected to the network 614. Also upon power up, indicator lights 114 should light up for each row of the dispenser 100 indicating that the individual rows have not yet been configured in the related eco-system enabled application on the associated mobile device 616.

The user then loads the dispenser 100 by filling each row of the dispenser with single server coffee packs 618. The dispenser 100, in turn, sends quantity information regarding the number of coffee packs loaded in each row of the dispenser 100 to the application 620.

In order to configure the individual rows of the dispenser 100 in the eco-system enabled application, the user runs the eco-system enabled application on the associated mobile device and is prompted to enter configuration information 622. If the dispenser 100 is empty when the user opens the application, the application can be configured to present fulfillment options to the user for purchasing single server coffee packs for use in stocking the dispenser 100. In other words, when the user opens the application after associating it with a dispenser 100, the application provides the user with a list of the different single serve coffee packs which can be used for filling the dispenser 100 and also gives the user the option of purchasing coffee packs, either for home delivery, pick up from a retail store, or as part of a subscription, in case the user did not purchase coffee packs when he or she purchased the dispenser or in case the user is out of stock of coffee packs.

If the dispenser 100 has already been filled with coffee packs, the application allows the user select a row and the application prompts the user to fill in flavor information corresponding to the flavor of coffee packs loaded into the selected row, as well as the total number of this flavor of coffee packs purchased by the user, so that the application can track how many extra coffee packs the user might have in storage to determine when to prompt the user to replenish this flavor of coffee packs 624. After the user has entered flavor and quantity information for each row in which coffee packs were loaded, the activation lights 114 on the dispenser are turned off signaling that the dispenser 100 and application data are synced.

Figure 7:
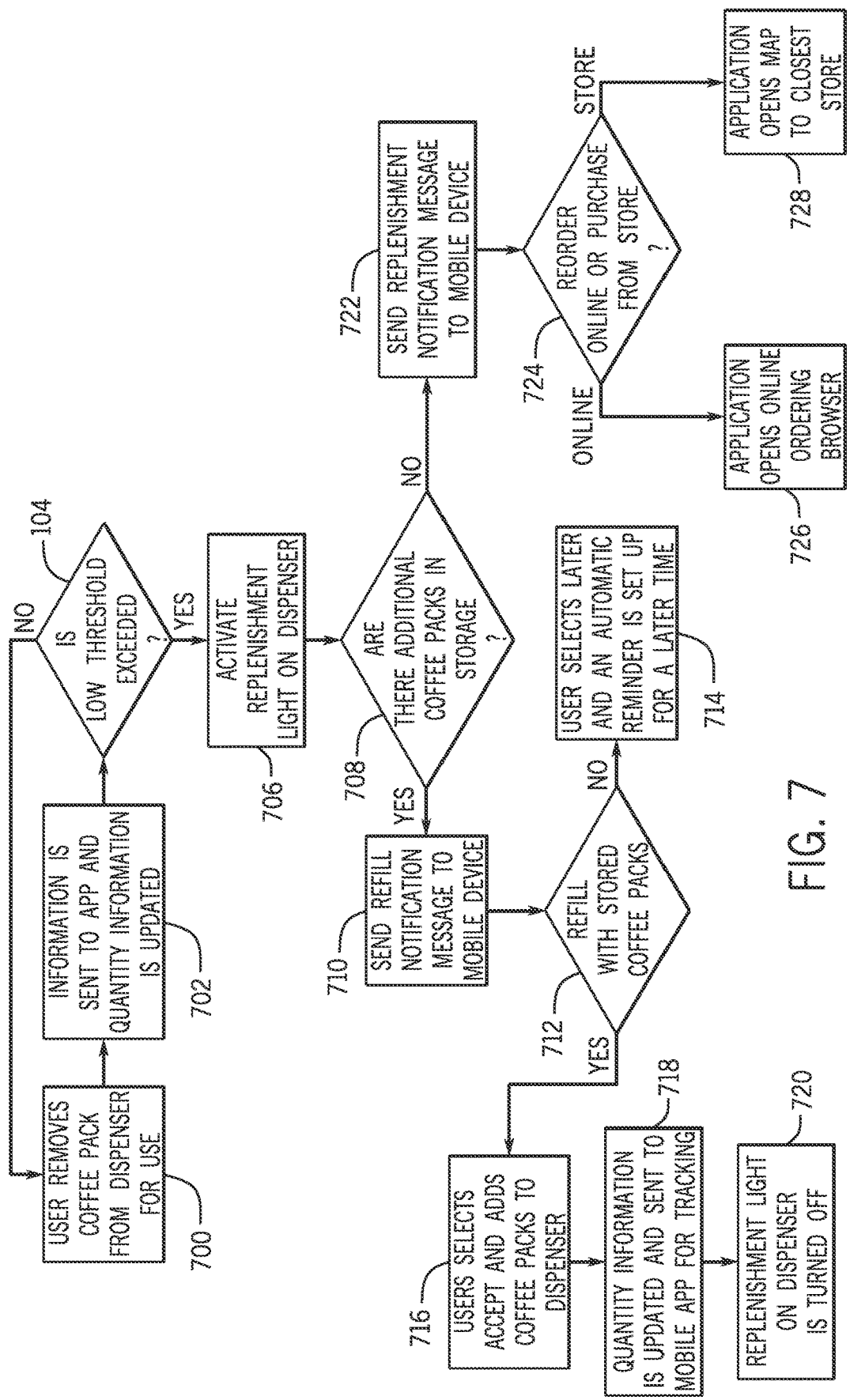
FIG. 7 illustrates example processes performed in accordance with various embodiments for storing, dispensing, and replenishing single serve coffee packs.

FIG. 7 is a flow chart illustrating example processes for using the dispenser 100 performed in accordance with various embodiments as described above. Once the dispenser 100 has been filled and configured, as illustrated in FIG. 6 and the corresponding description, the user may begin using the dispenser 100. During use, coffee packs are removed from the dispenser 100 for use in brewing coffee in a corresponding coffee maker 700. Each time a coffee pack is removed, the dispenser 100 senses from which row the coffee pack was removed and this information is sent from the dispenser 100 to the application so that the application can update quantity information 702. After updating the quantity information, the application determines whether or not the low threshold has been exceeded 704. If not, the process returns to normal operation in step 700. If the low threshold has been exceeded, the replenishment light 116 is activated on the dispenser 100 in the corresponding row 706.

Next, the application determines whether or not the user has additional coffee packs of the same flavor as currently stored in the row that exceeded the low threshold 708. If the user does have additional coffee packs of the correct flavor, the application displays a refill notification message on the mobile device notifying the user that a row of the dispenser 100 should be refilled and that the user should have additional coffee packs available for refill 710. The application can also ask the user whether or not the user wishes to refill the dispenser 100 immediately 712. If so, the user accepts the notification and adds coffee packs to the appropriate row of the dispenser 716. The quantity information is then updated and sent to the application for tracking 718 and the replenishment light 116 on the dispenser is turned off. If the user rejects the refill notification message, the application can be configured to automatically set a reminder which will be displayed at a later time reminding the user that a row of the dispenser needs to be refilled 714.

If the application determines that the user does not have additional coffee packs in storage, the application can send a replenishment notification message to the mobile device signaling the user that he or she should purchase additional coffee packs to replenish the dispenser 722. Along with the replenishment notification message, the application can ask the user if he or she would like to reorder the additional coffee packs online or purchase them from a store 724. If the user selects order online, the application opens an online ordering browser and prompts the user to complete the order information 726, as described in more detail herein. If the user selects purchase from a store, the application can check for nearby retail stores, check the inventory of the nearby retail stores to ensure that the desired flavor of coffee packs is currently in stock, and then open a map on the mobile device with direction to the closest store that has the desired flavor in stock 728, as described in more detail herein.

Various embodiments of the present invention may be implemented in a system having multiple communication devices that can communicate through one or more networks. The system may comprise any combination of wired or wireless networks such as a mobile telephone network, a wireless Local Area Network (LAN), a Bluetooth personal area network, an Ethernet LAN, a wide area network, the Internet, etc. The communication devices may communicate using various transmission technologies such as OFDM, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc.

Figure 8:
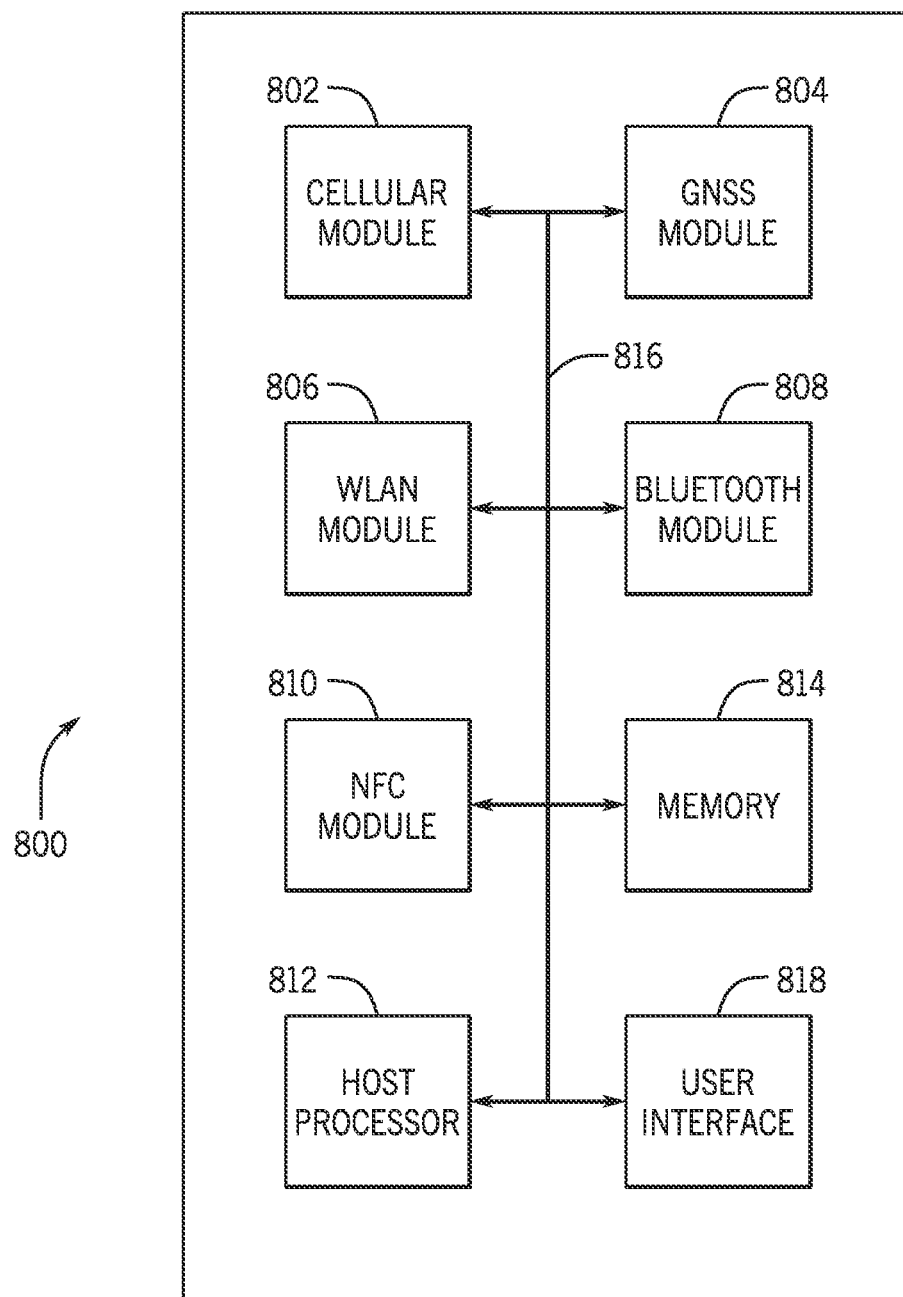
FIG. 8 is a schematic representation of an example mobile device through which various embodiments can be implemented.

A mobile device 800, such as smart phone 308, in accordance with various embodiments may include various elements, components, and/or modules for implementing the above-described features. FIG. 8 illustrates a block diagram of an exemplary mobile device 800 which includes an eco-system enabled application or applications according to various embodiments described in more detailed herein. The mobile device 800 may communicate information over wired and/or wireless communication networks in accordance with various communication standards. The mobile device 800 can represent for example, a cellular phone or a smartphone, a mobile computing device, such as a tablet computer, a personal digital assistant, a watch, or a laptop computer, or any other electronic device that is capable of communicating information over communication networks that will be apparent to those skilled in the relevant arts. The mobile device 800 can be implemented to be substantially similar to the mobile devices 302-308 shown in FIG. 3.

The mobile device 800 can include a cellular module 802, a location based services module, such as GNSS module 804, a wireless local area network (WLAN) module 806, a Bluetooth® module 808, a Near Field Communication (NFC) module 810, a host processor 812, a memory 814, a user interface 818, or any combination thereof which are communicatively coupled to one another via a communication interface 816. The various modules can be used in assisting to determine the location of the mobile device 800 for use in the eco-system enabled application and/or to provide communications links for allowing the mobile device 800 to communicate with other mobile devices as described in more detail herein with respect to the eco-system enabled application. The host processor 812 and memory 814 can also be used for implementing and/or storing the eco-system enabled application and/or data for implementing some aspects of the eco-system enabled application. In some implementations, two or more of the modules included in the mobile device 800 can be integrated to form a combination module. The mobile device 800 need not include all of: the cellular module 802, the GNSS module 804, the WLAN module 806, the Bluetooth® module 808 and/or the NFC Module 810. Those skilled in the relevant art(s) will recognize that other configurations and arrangements of the mobile device 800 may be possible. Additionally, those skilled in the relevant art(s) will also recognize that the cellular module 802, the GNSS module 804, the WLAN module 806, the Bluetooth® module 808, the NFC Module 810, the host processor 812, the memory 814, and the user interface 818 need not necessarily be communicatively coupled to one another via the communication interface 816. In some situations, those modules that are communicatively coupled to the communication interface 816 can independently communicate with other communication enabled devices without communication interface 816.

The cellular module 802 can provide wireless communication between the mobile device 800 and a cellular BS, such as the cellular BS 314 shown in FIG. 3, over a cellular network in accordance with various cellular communication standards such as a Generation Partnership Project (3GPP) Long Term Evolution (LTE) communications standard, a fourth generation (4G) mobile communications standard, or a third generation (3G) mobile communications standard to provide some examples. The cellular module 802 may communicate with one or more transceivers, referred to as BSs or APs, within the cellular network to provide voice and/or data communications between the mobile device 800 and another cellular capable device via a network, such as the mobile core network 310 shown in FIG. 3. The mobile core network may include a cellular telephone exchange that connects to a public telephone network or to another cellular telephone exchange within the mobile cellular network.

The GNSS module 804 can provide wireless communications between the mobile device 800 and a GNSS Network, such as the GNSS Network 320 shown in FIG. 3, in accordance with various GNSS standards. The GNSS module 804 can receive various signals from various GNSS satellites, such as the satellites 322a-322n shown in FIG. 3, and to calculate a position of the mobile device 800 based on the received signals. The GNSS module 804 may be implemented using a GNSS receiver which can use the GPS, GLONASS, Galileo and/or Beidou systems, among others, for calculating the position of the mobile device 800.

The WLAN module 806 can provide wireless communications between the mobile device 800 and a wireless AP, such as the wireless AP 312 shown in FIG. 3, over a wired communication network and/or to a wireless communication network in accordance with various networking protocols such a Wi-Fi™ communications standard. The WLAN module 806 can operate as a client to communicate with a wireless AP or as an AP itself to provide communications between other WLAN capable devices and a communication network. The WLAN module 806 may communicate with the mobile core network and/or the internet, through the wireless AP, via one or more links and/or associated devices for example. In this manner, the WLAN module 806 may provide network access to the mobile device 800 via the wireless AP.

The Bluetooth® module 808 can provide wireless communications between the mobile device 800 and a Bluetooth® emitter, such as the Bluetooth® emitter 316 shown in FIG. 3, over various Bluetooth® and/or Bluetooth® Low Energy (BLE) standards. The Bluetooth® module 808 can communicate with the mobile core network and/or the internet, via the Bluetooth® emitter, through one or more backhaul links and/or associated devices for example. In this manner, the Bluetooth® module 808 may provide network access to the mobile device 800 via the Bluetooth® emitter.

The NFC Module 810 can provide short range wireless communications between the mobile device 800 and another NFC device, such as the NFC terminal 318 shown in FIG. 3, over various short range communication standards such as the Near Field Communications standard. The NFC module 810 can communicate with the mobile core network and/or internet, via the NFC terminal through one or more backhaul links and/or associated devices for example. In this manner, the NFC module 810 may provide network access to the mobile device 800 via the NFC terminal.

The host processor 812 can control overall operation and/or configuration of the mobile device 800. The host processor 812 may receive information from, among other things, the user interface 216 and/or from other electrical devices or host devices that are coupled to the mobile device 800. The host processor 810 can provide this information to the cellular module 802, the GNSS module 804, the WLAN module 806, the Bluetooth® module 808, the NFC module 810, the memory 814, and/or the user interface 818. Additionally, the host processor 812 can receive information from the cellular module 802, the GNSS module 804, the WLAN module 806, the Bluetooth® module 808, the NFC module 810, and/or the memory 814. The host processor 812 may provide this information to the user interface 818, to other electrical devices or host devices, and/or to the cellular module 802, the GNSS module 804, the WLAN module 806, the Bluetooth® module 808, the NFC Module 810, and/or the memory 814 via the communication interface 816. Further, the host processor 812 can execute one or more applications such as SMS for text messaging, electronic mailing, and/or audio and/or video recording, and/or software applications such as a calendar and/or a contact list to provide some examples. The host processor 812 can also execute an eco-system enabled application such as the exemplary embodiments described herein.

The user interface 818 can include a display, such as a touch-screen display, an alphanumeric keypad, a microphone, a mouse, a speaker, or another suitable input/output device capable of receiving user input and/or providing data to the user of the device. User provided information can be input into the user interface 818 such as by typing on the alphanumeric keypad, typing or selecting on the touch-screen display, selecting with the mouse, receiving verbal information and commands from the microphone, and/or through other methods of receiving user input. Information can be provided to the user through the user interface 818 such as by displaying the information on the touch-screen display, providing verbal information through the speaker, or through other methods of conveying and/or displaying information. The user interface 818 can interface with the host processor 812 to provide information to the host processor 812, such as via the communication interface 816 and to display information provided by the host processor 812 via the communication interface 816 to the user of the device. The user interface 816 can also receive and provide information to/from the cellular module 802, the GNSS module 804, the WLAN module 806, the Bluetooth® module 808, the NFC Module 810, and/or the memory 814.

The communication interface 816 can route various communications between the cellular module 802, the GNSS module 804, the WLAN module 806, the Bluetooth® module 808, the NFC Module 810, the host processor 812, the memory 814, and/or the user interface 818. These communications can include various digital signals, such as one or more commands and/or data, various analog signals, such as direct currents (DC) and/or voltages to provide some examples, or any combination thereof. The communication interface 816 can be implemented as a series of wired and/or wireless interconnections between the cellular module 802, the GNSS module 804, the WLAN module 806, the Bluetooth® module 808, the NFC Module 810, the host processor 812, the memory 814, and/or the user interface 818. The interconnections of the communication interface 816, as well as interconnections of other communication interfaces that are discussed below, can be arranged to form a parallel interface to carry communications between various modules of the mobile device 800 in parallel using multiple conductors, a serial interface to carry communications between various modules of the mobile device 800 200 using a single conductor, or any combination thereof. A mobile device, such as mobile device 800, may include one or more integrated circuits that can be configured and arranged to form one or more modules, such as the cellular module 802, the GNSS module 804, the WLAN module 806, the Bluetooth® module 808, the NFC Module 810, the host processor 812, the memory 814, and/or the user interface 818 to provide some examples.

Various embodiments described herein are described in the general context of method steps or processes, which may be implemented in one embodiment by a software program product or component, embodied in a machine/computer-readable medium, including executable instructions, such as program code, executed by entities in networked environments. Generally, program modules may include routines, programs, objects, components, data structures, etc. that perform particular tasks or implement particular abstract data types. Executable instructions, associated data structures, and program modules represent examples of program code for executing steps of the methods disclosed herein. The particular sequence of such executable instructions or associated data structures represents examples of corresponding acts for implementing the functions described in such steps or processes.

Various descriptions of given units of functionality that can be performed in accordance with one or more embodiments are provided herein, and may be described as or thought of as modules. Such units of functionality, e.g., a module, might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality. Where components or modules of the invention are implemented in whole or in part using software, in one embodiment, these software elements can be implemented to operate with a computing or processing module capable of carrying out the functionality described with respect thereto.

The foregoing description of various embodiments have been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

If desired, the different functions discussed herein may be performed in a different order and/or concurrently with each other. Furthermore, if desired, one or more of the above-described functions may be optional or may be combined.

Although various aspects of various embodiments are set out in the independent claims, other aspects of the present disclosure comprise other combinations of features from the described embodiments and/or the dependent claims with the features of the independent claims, and not solely the combinations explicitly set out in the claims.

What is claimed is:

1. At least one non-transitory computer-readable memory including computer executable instructions, the computer executable instructions, which when executed by at least one processor, cause a system to perform a method comprising:
   receiving, from a sensor of a dispenser, a storage status update indicating a remaining quantity of a consumable item associated with the dispenser;
   determining whether the storage status meets a predetermined threshold associated with the consumable item;
   upon a determination that the storage status of the dispenser meets the predetermined threshold associated with the consumable item—
      sending a replenishment notification to a mobile device via a mobile device application with a recommendation to order an additional quantity of the consumable item,
      determining a location of a retailer located proximate to a current location of the mobile device at which additional consumable items are purchasable, and
      providing, via the mobile device application, a user interface at the mobile device adapted to allow online purchasing of the additional quantity of the consumable item at the proximately located retailer via the mobile device; and
   communicating with the retailer to reorder the additional quantity of the consumable item.

2. The computer-readable memory of claim 1 wherein the method further comprises:
   receiving, from a user via a user interface of the mobile device application, data related to a quantity of the consumable item stored separate from the dispenser; and
   determining the storage status based on the data related to the quantity of consumable goods stored separate from the dispenser and the storage status update from the sensor.

3. The computer-readable memory of claim 1 wherein:
   determining whether the storage status meets the predetermined threshold comprises predictively determining when the consumable item will be depleted based on at least one of previous depletion rates and order history; and
   sending the replenishment notification comprises sending the replenishment notification a predetermined time in advance of depletion.

4. The computer-readable memory of claim 1 wherein the method further comprises pairing the dispenser with the mobile device application.

5. The computer-readable memory of claim 1 wherein the method further comprises
receiving product information related to the consumable item via the mobile device application; and
receiving purchase options from the user via a user interface of the mobile device application, wherein the purchase options include product type and subscription data.

6. A mobile device, comprising:
at least one processor; and
at least one memory including computer program code, the at least one memory and the computer program code configured to, with the at least one processor, cause the mobile device to perform at least the following:
receive a storage status update from a dispenser adapted to store and dispense consumable items;
determine, based on the received storage status update, whether a current storage status associated with the dispenser falls below a replenishment threshold; and
upon determining that the current storage status falls below the replenishment threshold, then—
determine a current location of the mobile device,
determine a location of a retailer located proximate to the current location of the mobile device at which additional consumable items are purchasable,
present a notification indicating a suggestion to replenish the dispenser,
present the location of the retailer determined to be located proximate to the mobile device at which additional consumable items are purchasable, and
present a user interface to allow online ordering of the additional items at the retailer such that the additional items are available for pick up at the retailer.

7. The mobile device of claim 6, wherein the at least one memory and the computer program code configured to, with the at least one processor, cause the mobile device to present as an additional purchasing option to the retailer located proximate to the mobile device, that allows online purchasing of the additional consumable items.

8. The mobile device of claim 6, wherein the storage status update and the current storage status include information regarding at least one type of the consumable items and at least one quantity of the consumable items.

9. A system comprising:
a communications network over which a storage status update is transmitted;
a dispenser for storing and dispensing a plurality of consumable items, wherein the dispenser includes at least one sensor for detecting a storage status of the plurality of consumable items and wherein the dispenser generates the storage status update based on the storage status detected by the at least one sensor; and
a mobile device adapted to execute an application, the application adapted to:
receive the storage status update from the dispenser;
determine a retailer located proximate to the mobile device at which additional consumable items are purchasable; and
present a notification indicating a suggestion to replenish the dispenser based on the storage status update and the retailer located proximate to the mobile device at which additional consumable items are purchasable to replenish the dispenser.

10. The system of claim 9, wherein the application is adapted to present a user interface adapted to allow online purchasing of the additional consumable items via the mobile device instead of presenting the notification indicating the retailer located proximate to the mobile device.

11. The system of claim 9, wherein the application is adapted to present, as an additional purchasing option to the retailer located proximate to the mobile device, a user interface adapted to allow online purchasing of the additional items via the mobile device.

12. The system of claim 9, wherein the application is further adapted to present user-targeted information based on at least one of the additional consumable items suggested to replenish the dispenser, a previous purchasing history, and a social media outlet to which the application has access.

13. A computer-readable memory including computer executable instructions, the computer executable instructions, which when executed by a processor, cause an apparatus to perform a method comprising:
receiving, at a mobile device, a storage status update indicating a remaining quantity of a type of single serve coffee packs stored in a dispenser;
updating a current storage status associated with the type of single serve coffee packs based on the received storage status update;
determining whether the updated current storage status meets a predetermined threshold associated with the type of single serve coffee packs;
determining a location of the mobile device; and
upon a determination that the updated current storage status of the dispenser meets the predetermined threshold associated with the type of single serve coffee packs, presenting a notification on the mobile device suggesting ordering an additional quantity of the type of single serve coffee packs, determining a retailer proximately located to the mobile device at which the additional quantity of the type of single serve coffee packs are purchasable, and presenting a user interface on the mobile device to allow online ordering of the additional quantity of the type of single server coffee packs for pickup at the retailer proximately located to the mobile device.

14. A method, comprising:
receiving, at a mobile device, a storage status update indicating a remaining quantity of a type of single serve coffee packs stored in a dispenser;
updating a current storage status associated with the type of single serve coffee packs based on the received storage status update;
determining whether the updated current storage status meets a predetermined threshold associated with the type of single serve coffee packs;
determining the location of the mobile device; and
upon a determination that the updated current storage status of the dispenser meets the predetermined threshold associated with the type of single serve coffee packs, presenting a notification on the mobile device suggesting ordering an additional quantity of the type of single serve coffee packs, determining a retailer proximately located to the mobile device at which the additional quantity of the type of single serve coffee packs are purchasable, and presenting a user interface on the mobile device to allow online ordering of the additional quantity of the type of single server coffee packs for pickup at the retailer proximately located to the mobile device.

15. The method of claim 14 further comprising, presenting directions to the proximately located retailer on the mobile device.

\* \* \* \* \*